United States Patent
Ishii et al.

(10) Patent No.: US 7,012,548 B2
(45) Date of Patent: Mar. 14, 2006

(54) DRIVING OPERATION ASSISTING METHOD AND SYSTEM

(75) Inventors: Hirofumi Ishii, Kanagawa (JP); Shusaku Okamoto, Osaka (JP); Kunio Nobori, Osaka (JP); Masamichi Nakagawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 590 days.

(21) Appl. No.: 09/826,797

(22) Filed: Apr. 5, 2001

(65) Prior Publication Data

US 2002/0005779 A1 Jan. 17, 2002

(30) Foreign Application Priority Data

Apr. 5, 2000 (JP) .................................... 2000-103037

(51) Int. Cl.
*B60Q 1/48* (2006.01)

(52) U.S. Cl. .................. 340/932.2; 340/436; 701/1; 701/41; 348/148

(58) Field of Classification Search ............ 340/932.2, 340/903, 988, 990, 995.1–995.28, 435, 436; 701/1, 41, 36, 42, 301, 200; 348/148, 149
See application file for complete search history.

(56) References Cited

U.S. PATENT DOCUMENTS

| | | | |
|---|---|---|---|
| 4,931,930 A | | 6/1990 | Shyu et al. |
| 5,969,969 A | | 10/1999 | Ejiri et al. |
| 6,476,730 B1 | * | 11/2002 | Kakinami et al. ....... 340/932.2 |
| 6,611,744 B1 | * | 8/2003 | Shimazaki et al. ........... 701/41 |
| 6,654,670 B1 | * | 11/2003 | Kakinami et al. ............. 701/1 |
| 6,701,226 B1 | * | 3/2004 | Yamada et al. ................ 701/1 |
| 6,711,473 B1 | * | 3/2004 | Shimazaki et al. ............ 701/1 |
| 2003/0030724 A1 | * | 2/2003 | Okamoto ..................... 348/148 |

FOREIGN PATENT DOCUMENTS

| | | |
|---|---|---|
| EP | 0 835 796 A2 | 4/1998 |
| JP | 64-14700 | 1/1989 |
| JP | 04160608 A | 6/1992 |
| JP | 09180100 A | 7/1997 |
| JP | 10244891 A | 9/1998 |
| JP | 10264840 A | 10/1998 |
| JP | 11001177 A | 1/1999 |
| JP | 11157404 A | 6/1999 |
| JP | 2000-79860 | 3/2000 |
| JP | 2000072019 A | 3/2000 |
| JP | 2000-280823 | 10/2000 |
| JP | 2001-315600 | * 11/2001 .............. 340/932.2 |
| WO | WO 00/07373 | 2/2000 |

OTHER PUBLICATIONS

European Search Report for Application No. 01108646.9; Jul. 18, 2002.
Notice of Reasons for Rejection mailed Jul. 23, 2002 for Japanese patent application corresponding U.S. patent application; English translation of Notice also provided.

* cited by examiner

*Primary Examiner*—Daryl C Pope
(74) *Attorney, Agent, or Firm*—Harness, Dickey & Pierce, P.L.C.

(57) ABSTRACT

In a driving operation assisting technique, the burden on a user is reduced. The user is allowed to specify, on an image representing the surrounding conditions around a vehicle, the end position of the vehicle at the end of a predetermined driving operation by using, for example, a pointer. A driving operation assisting system obtains the start position of the driving operation based on a prescribed movement pattern representing the movement of the vehicle in the driving operation, and superimposes the end position on the display image.

10 Claims, 22 Drawing Sheets

| Number of revolutions of tire (Unit: revolution) | Rudder angle of steering wheel (Unit: degree) |
|---|---|
| 0.25 | 0 |
| 0.25 | -45 |
| 0.25 | -90 |
| 0.2 | -135 |
| 0.1 | -180 |
| 0.2 | -135 |
| 0.25 | -90 |
| 0.25 | -45 |
| 0.8 | 0 |
| 0.25 | 45 |
| 0.25 | 90 |
| 0.2 | 135 |
| 0.1 | 180 |
| 0.2 | 135 |
| 0.25 | 90 |
| 0.25 | 45 |
| 0.25 | 30 |
| 0.25 | 15 |
| 0.5 | 5 |
| 0.5 | 0 |

| Number of revolutions of tire (Unit: revolution) | Rudder angle of steering wheel (Unit: degree) |
|---|---|
| 0.2 | 0 |
| 0.25 | 45 |
| 0.25 | 90 |
| 0.2 | 135 |
| 0.1 | 180 |
| 0.2 | 135 |
| 0.25 | 90 |
| 0.25 | 45 |
| 0.25 | 30 |
| 0.25 | 15 |
| 0.5 | 5 |
| 0.75 | 0 |

FIG. 11
Prescribed movement pattern PT1
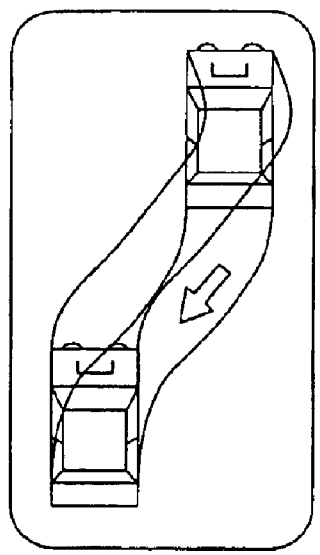
Prescribed movement pattern PT2
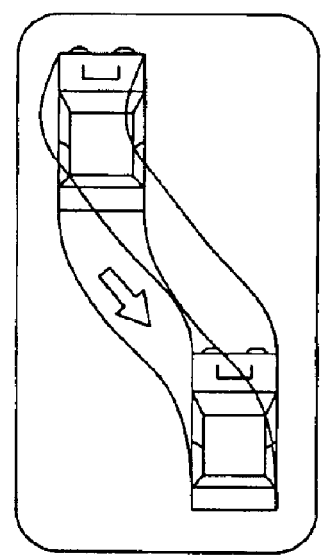
Prescribed movement pattern PT3
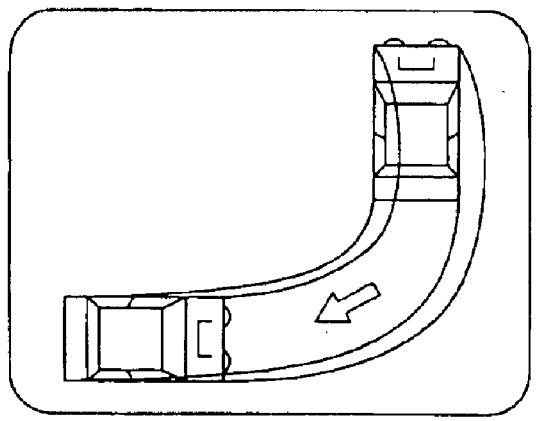
Prescribed movement pattern PT4
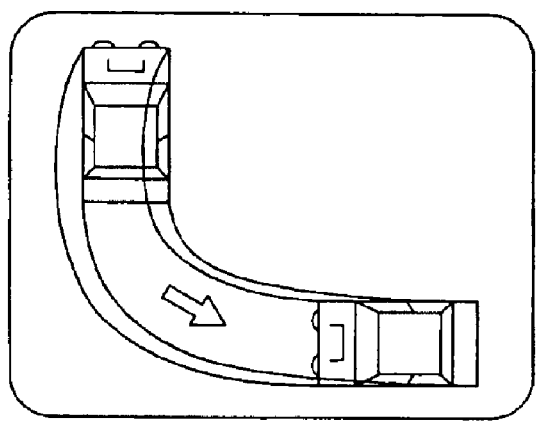

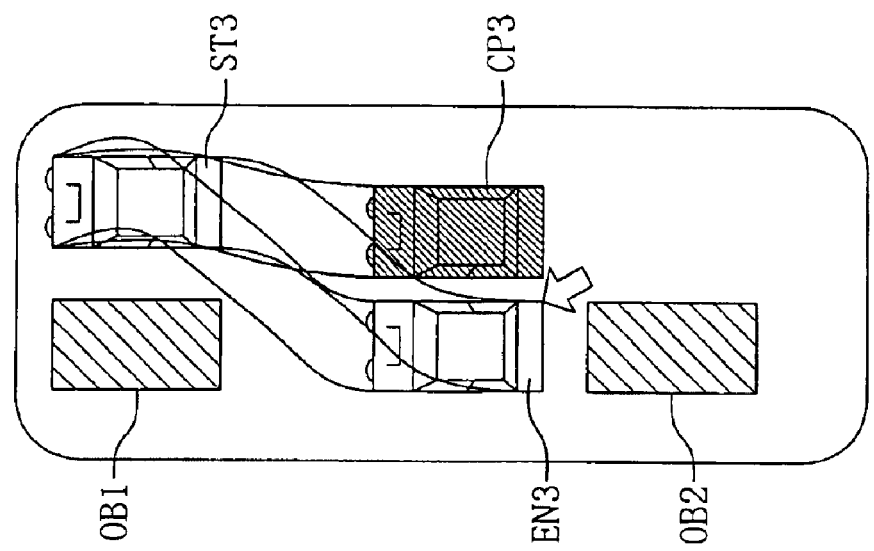
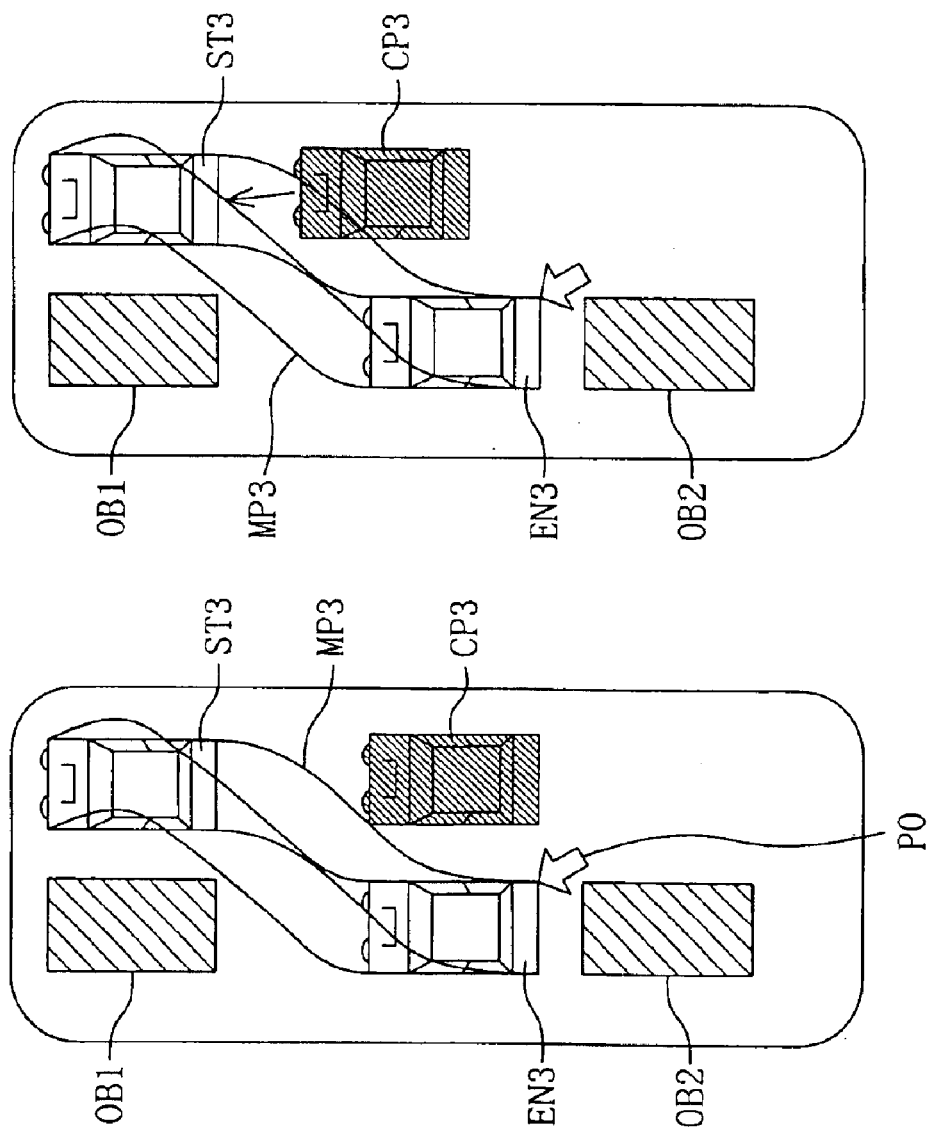

| Number of revolutions of tire (Unit: revolution) | Rudder angle of steering wheel (Unit: degree) | |
|---|---|---|
| 0.2 | 180 | Backward |
| 0.4 | 180 | |
| 0.6 | 180 | |
| 0.8 | 180 | |
| 0.8 | -180 | Forward |
| 0.6 | -180 | |
| 0.6 | 180 | Backward |
| 0.8 | 180 | |
| 1 | 90 | |
| 1.2 | 30 | |
| 1.4 | 0 | |

| Number of revolutions of tire (Unit: revolution) | Rudder angle of steering wheel (Unit: degree) |
|---|---|
| 0.2 | 180 |
| 0.4 | 180 |
| 0.6 | 180 |
| 0.8 | 180 |
| 0.8 | -180 |
| 0.6 | -180 |
| 0.6 | 180 |
| 0.8 | 180 |
| 1 | 90 |
| 1.2 | 30 |
| 1.4 | 0 |

| Number of revolutions of tire (Unit: revolution) | Rudder angle of steering wheel (Unit: degree) |
|---|---|
| 0.2 | 30 |
| 0.4 | 120 |
| 0.7 | 180 |
| 0.9 | 180 |
| 0.9 | -180 |
| 0.7 | -180 |
| 0.7 | 180 |
| 0.9 | 180 |
| 1.1 | 90 |
| 1.2 | 30 |
| 1.4 | 0 |

DRIVING OPERATION ASSISTING METHOD AND SYSTEM

BACKGROUND OF THE INVENTION

The present invention relates to a driving operation assisting technique for providing an assistance in a vehicle driving operation.

A common driving operation assisting system in the prior art uses a steering sensor for detecting the rudder angle of the steering wheel so as to estimate the vehicle tire (movement) trace according to the rudder angle of the steering wheel when moving the vehicle backward (see Japanese Laid-Open Patent Publication No. 1-14700). In this system, when moving the vehicle backward, the rear view or the rear-side view is imaged by a camera and displayed, while the vehicle tire trace which is estimated according to the rudder angle of the steering wheel being operated is superimposed on the image.

When using this system, the driving operation is as follows. That is, first, the vehicle is moved to a position where it is likely to be possible to move the vehicle into a parking space with the steering wheel being fixed. Then, in this position, the user operates the steering wheel while viewing the estimated vehicle tire trace so as to find a rudder angle at which it is likely to be possible to move the vehicle into the parking space without having to further operate the steering wheel. Then, the vehicle is moved backward while keeping the rudder angle so as to move the vehicle into the parking space. In principle, the parking operation is completed through such a driving operation.

-Problems to be Solved-

When parking a vehicle by using the system as described above, it is necessary to find a position from which the vehicle can be moved into the parking space, and then to determine the rudder angle at which to fix the steering wheel. However, it takes the user a considerable amount of practice to be skilled in such operations. Moreover, when the size, etc., of the vehicle to be driven changes, the sense of the size of the vehicle also changes, whereby the user cannot make good use of the driving know-how the user has built up while getting skilled in the operations with the previous vehicle.

Now, in the case of a parking operation, it is generally difficult to complete the driving operation while keeping the rudder angle of the steering wheel at a constant angle from the beginning of the operation, except for cases where there is no obstacle at all around the vehicle. For example, when performing parallel parking, the driver moves the vehicle from the start position to the parking position as follows. The driver first turns the steering wheel in an appropriate direction and moves the vehicle backward, and after the vehicle is moved backward to an appropriate position, the driver turns the steering wheel in the opposite direction to move the vehicle to the target position. In other words, in the case of parallel parking, it is difficult to park the vehicle while keeping the steering rudder angle at a constant angle.

Moreover, with the conventional system, if the driver moves the steering wheel even by a slight angle, a vehicle movement path is re-estimated in response to the slight change in the rudder angle, and the re-estimated path is displayed, which may confuse the driver.

Furthermore, since an actual vehicle body has some parts overhanging from the tires, the body may possibly contact an obstacle even if the tire trace does not interfere with the obstacle. Thus, in the prior art, it is difficult to precisely determine whether the vehicle parts extending beyond the tires will contact an obstacle.

SUMMARY OF THE INVENTION

An object of the present invention is to provide a driving operation assisting technique so as to further improve the user's convenience and reduce the user's burden with.

Specifically, the present invention provides a method for providing an assistance in a vehicle driving operation by displaying an image representing surrounding conditions around the vehicle on a display unit, the method including: a first step of allowing a user to specify, on the image on the display unit, an end position which is a position of the vehicle at an end of a predetermined driving operation; a second step of obtaining, for the end position, a start position which is a position of the vehicle at a start of the predetermined driving operation according to a prescribed movement pattern representing a movement of the vehicle in the predetermined driving operation.

According to this invention, only by specifying the end position of a predetermined series of driving operations to be performed, the start position of the driving operation can be automatically obtained, thereby reducing the amount of time required before starting the driving operation.

Further, it is preferred that the driving operation assisting method of the present invention further includes a step of displaying the start position, the end position and the prescribed movement pattern while being superimposed on the image on the display unit. Accordingly, whether the start position or the prescribed movement pattern interferes with an obstacle can be easily recognized on a screen.

It is preferred that in the first step, the end position specified by the user is taken as an input when the vehicle is in a vicinity of the end position. Thus, it is possible to more precisely specify the end position to be the target position.

Moreover, it is preferred that the driving operation assigning method of the present invention further includes a step of performing, in a full-automatic or semi-automatic manner, at least one of an operation of driving the vehicle from a current position of the vehicle to the start position and an operation of driving the vehicle from the start position to the end position according to the prescribed movement pattern.

Moreover, the present invention provides a system for providing an assistance in a vehicle driving operation, the system including: surrounding condition imaging means for producing an image representing surrounding conditions around the vehicle; prescribed movement pattern storage means for storing a prescribed movement pattern representing a movement of the vehicle in a predetermined driving operation; synthesized image production means for producing a synthesized image by superimposing the prescribed movement pattern on the surrounding condition image; a display unit for displaying the synthesized image; and pattern selection means for selecting the prescribed movement pattern based on a pointer input operation on a screen of the display unit.

According to this invention, a prescribed trace of the vehicle can be input through a pointer input operation on the screen of the display unit, thereby significantly facilitating the selection of the prescribed movement pattern.

Moreover, the present invention provides a system for providing an assistance in a vehicle driving operation, the system including an image processing section for producing an image representing surrounding conditions around the vehicle, wherein the image processing section produces a synthesized image by superimposing, on the surrounding condition image, a circumscribed area trace of space where the vehicle passes as the vehicle is moved by a predetermined driving operation.

According to this invention, the circumscribed area trace of space where the entire vehicle passes is displayed as an image, whereby the user can more precisely determine whether a part of the vehicle, such as a bumper, which extends beyond the tire will contact an obstacle.

It is preferred that the image processing section produces the surrounding condition image by synthesizing images output from a plurality of cameras provided on the vehicle.

BRIEF DESCRIPTION OF THE DRAWINGS

FIG. 11 is a diagram illustrating exemplary variations of prescribed movement patterns.

FIG. 13A, FIG. 13B and FIG. 13C are diagrams illustrating a driving operation assisting method in which the user is allowed to specify the end position according to the first embodiment of the present invention.

DETAILED DESCRIPTION OF THE INVENTION

Figure 1:
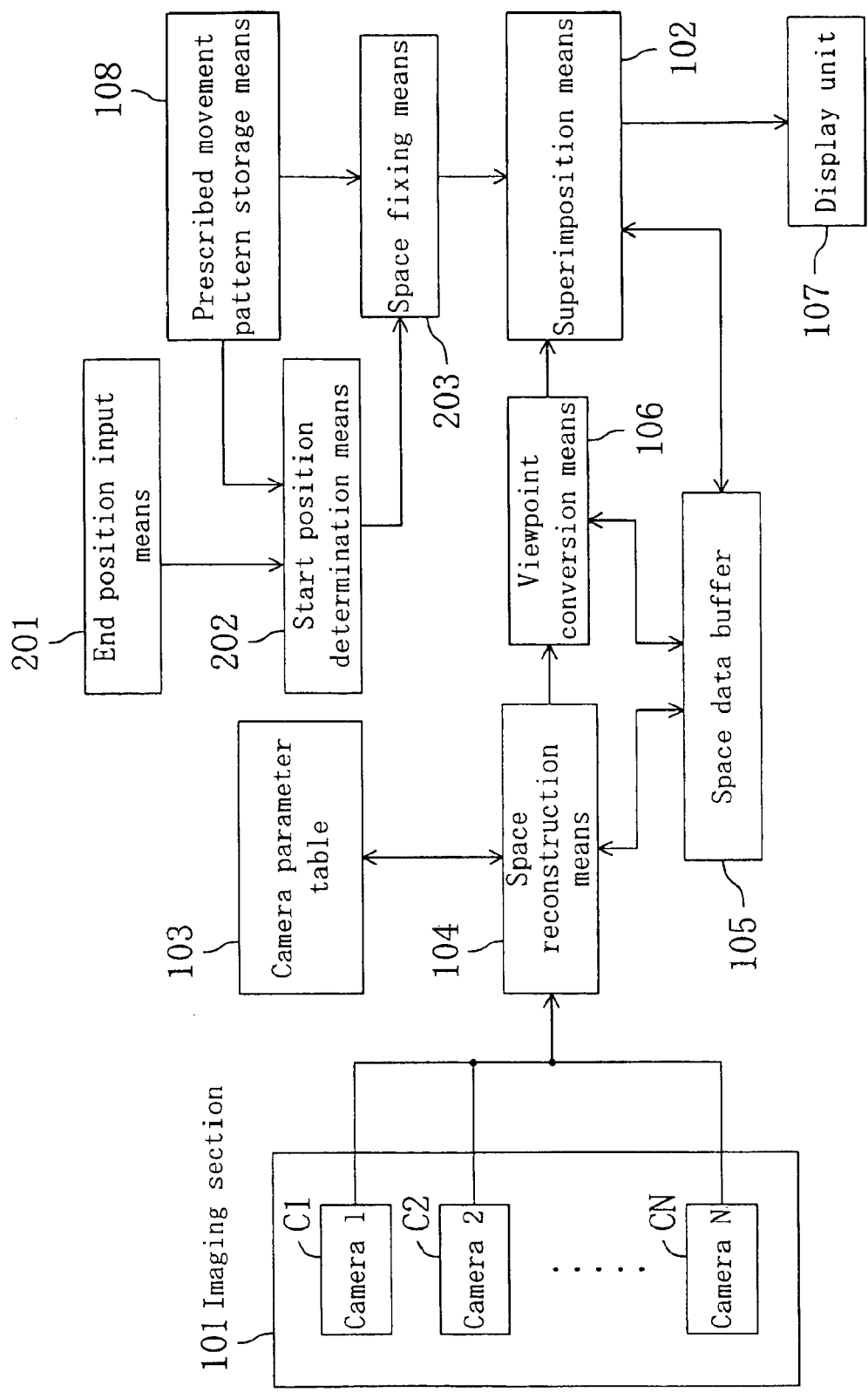
FIG. 1 is a block diagram illustrating a configuration of a driving operation assisting system according to the first embodiment of the present invention.

The embodiments of the present invention will now be described with reference to the accompanying drawings.
First Embodiment FIG. 1 is a block diagram illustrating a configuration of a driving operation assisting system according to the first embodiment of the present invention. The driving operation assisting system of the present embodiment primarily aims to provide an assistance in a driving operation such as perpendicular parking, parallel parking, and the like.

As illustrated in FIG. 1, the driving operation assisting system of the present embodiment includes: an imaging section 101 having N cameras (cameras C1 to CN); a camera parameter table 103 for storing camera parameters representing the characteristics of the cameras C1 to CN; space reconstruction means 104 for producing space data in which the respective pixels forming the output images from the cameras C1 to CN are correlated to points in a three-dimensional space based on the camera parameters; viewpoint conversion means 106 for producing, as a surrounding condition image, an image as viewed from a predetermined viewpoint by referencing the space data; a space data buffer 105 for temporarily storing the space data; prescribed movement pattern storage means 108 for storing prescribed movement data including prescribed movement patterns; superimposition means 102 for producing a synthesized image by superimposing the prescribed movement pattern on the surrounding condition image; and a display unit 107 for displaying the synthesized image. Moreover, the driving operation assisting system includes end position input means 201, start position determination means 202, and space fixing means 203.

The end position input means 201 is used to input with a pointer the target position, i.e., the end position, of the driving operation. Note that the end position may alternatively be input through a numeric input operation, etc.

The start position determination means 202 obtains the start position of the driving operation for the end position which is input through the end position input means 201, based on the prescribed movement pattern corresponding to the driving operation.

The space fixing means 203 fixes the prescribed movement pattern for the driving operation in the surrounding space of the synthesized image after the end position is specified through the end position input means 201. The prescribed movement pattern may be fixed by following characteristic points in camera images or to calculate the movement of the vehicle based on the actual steering angle or tire rotation of the vehicle so as to modify the movement of the surrounding space of the image by the movement.

First, the detailed configuration of the imaging section 101, and the process of producing the surrounding condition image from image data obtained by the imaging section 101, will be described.

Figure 2:
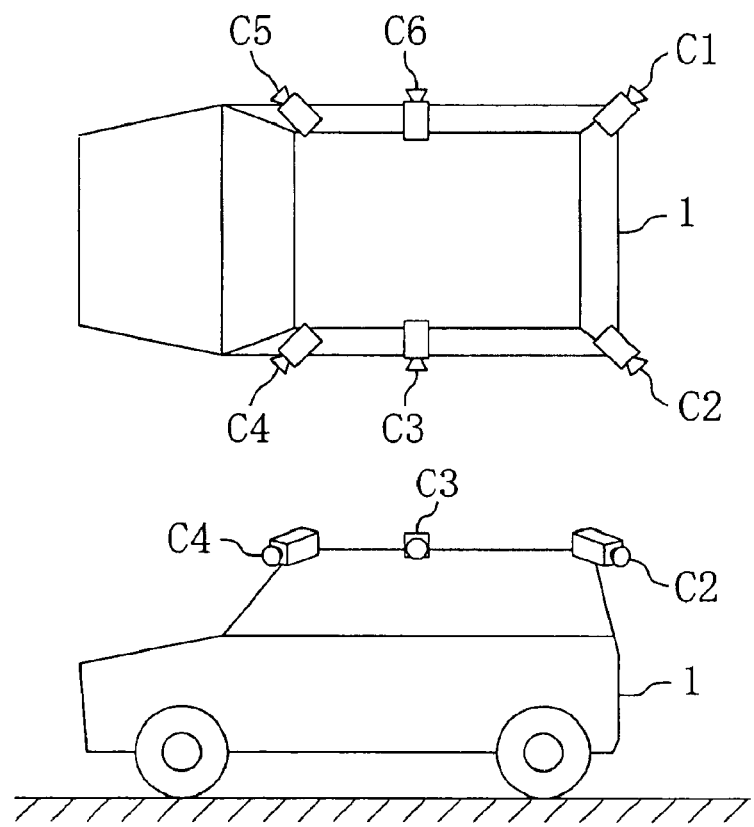
FIG. 2 is an exemplary arrangement of cameras on a vehicle.

FIG. 2 is a diagram illustrating an exemplary arrangement of the cameras C1 to CN of the imaging section 101 on a vehicle 1. In this example, N=6, and thus six cameras C1 to C6 are arranged on the roof of the vehicle 1. The cameras C1 to C6 are arranged so that the imaging range of one camera partially overlaps with the imaging range of another camera and that the entire imaging range has no dead angle in a plan view.

The camera parameter table 103 stores camera parameters (the attachment position, the attachment angle, the lens distortion correction value, the focal distance of the lens, etc.) representing the camera characteristics of the cameras C1 to CN. The space reconstruction means 104 produces space data in which the respective pixels forming the output images from the cameras C1 to CN are correlated to points in a three-dimensional space with respect to the vehicle based on the camera parameters. The space data is temporarily stored in the space data buffer 105, and the viewpoint conversion means 106 produces, as the surrounding condition image, an image as viewed from an arbitrary viewpoint, e.g., the viewpoint of a virtual camera VC illustrated in FIG. 3, by synthesizing the respective pixels by referencing the space data.

Figure 3:
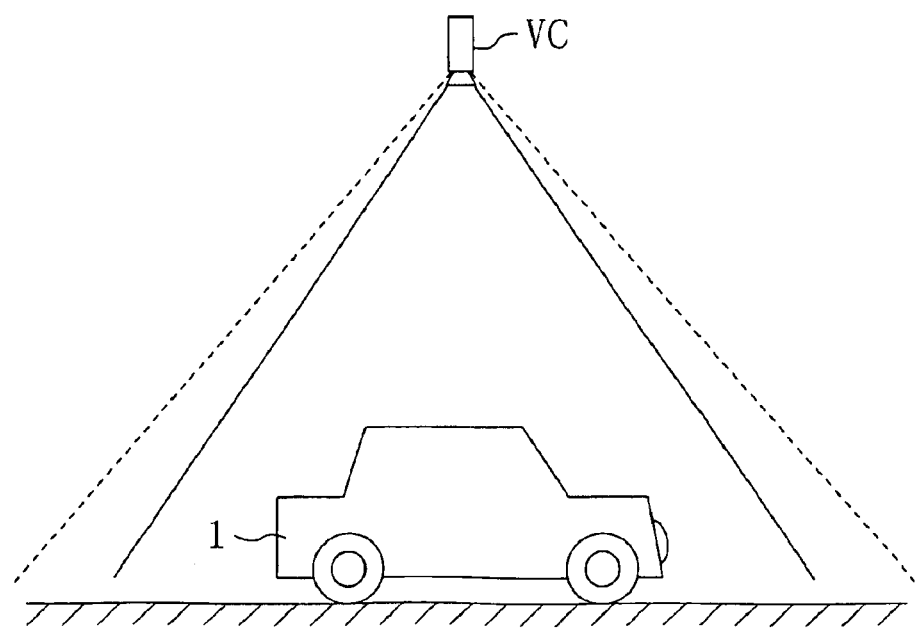
FIG. 3 is an exemplary viewpoint of a virtual camera.
Figure 4:
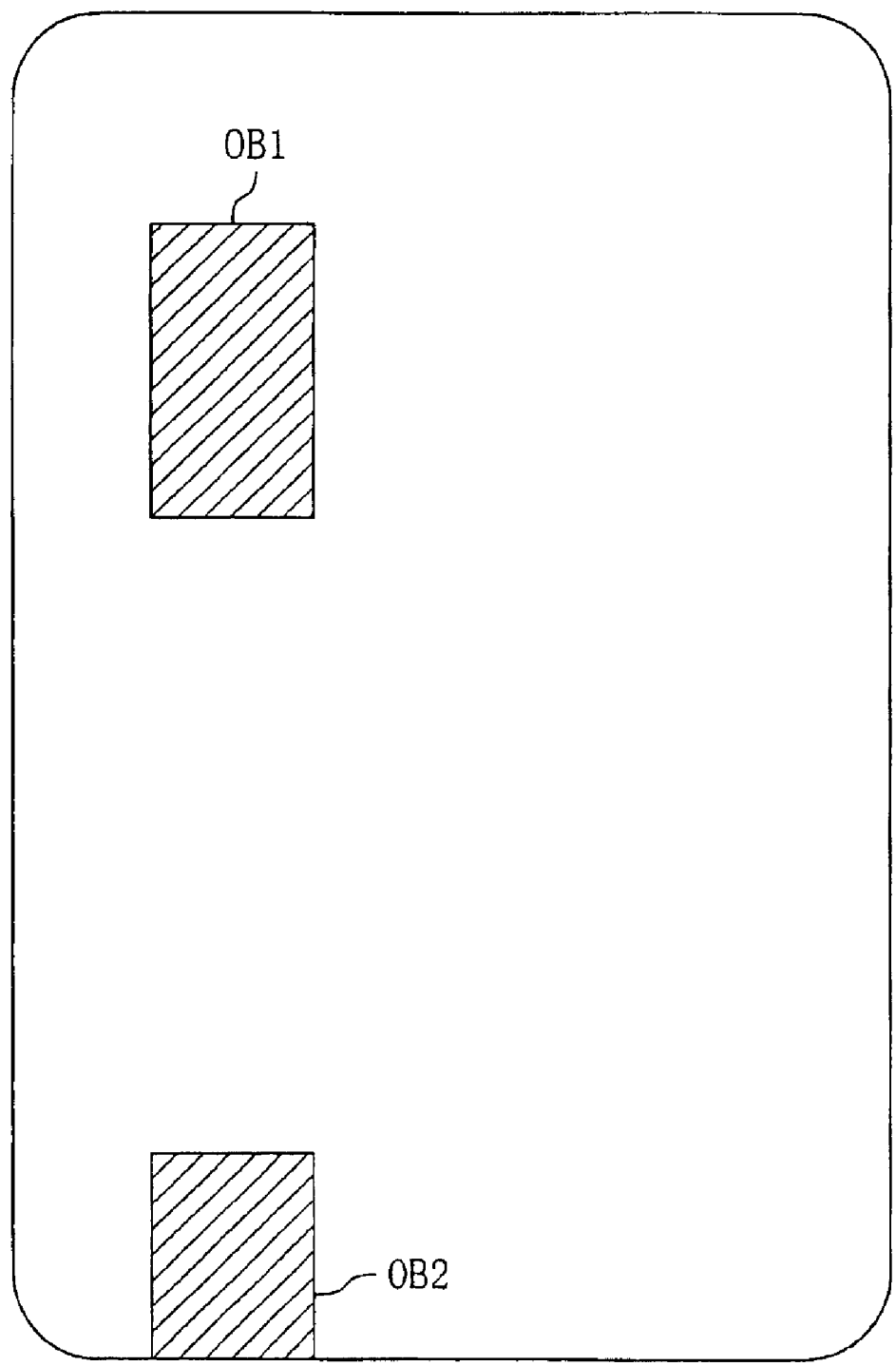
FIG. 4 is a diagram illustrating an exemplary surrounding condition image.

FIG. 4 illustrates an exemplary surrounding condition image as viewed from the viewpoint of the virtual camera VC illustrated in FIG. 3. The example of FIG. 4 is a case of parallel parking, wherein two parked vehicles are shown on the surrounding condition image as obstacles OB1 and OB2.

Next, the process of producing a synthesized image by the superimposition means 102 and displaying the synthesized image by the display unit 107 will be described.

The prescribed movement pattern storage means 108 stores as prescribed movement data: prescribed movement patterns each of which is image data representing the movement of the vehicle when performing a typical driving operation; and chronological data representing the relationship between the traveling distance of the vehicle (the amount of rotational movement of the tires) and the steering rudder angle (the steering angle) for each of the prescribed movement patterns.

Figures 5A, 5B:
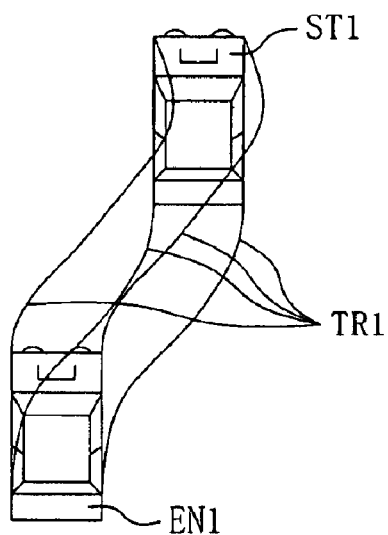
FIG. 5A and FIG. 5B are diagrams illustrating exemplary prescribed movement data for parallel parking to the left side.
Figures 6A, 6B:
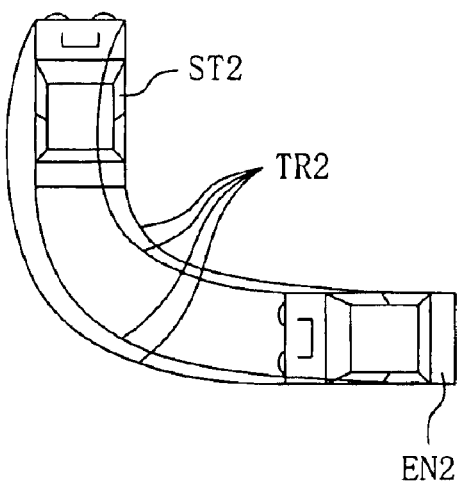
FIG. 6A and FIG. 6B are diagrams illustrating exemplary prescribed movement data for perpendicular parking to the right side.

FIG. 5A and FIG. 5B are diagrams illustrating exemplary prescribed movement data when performing a driving operation of parallel parking to the left side, and FIG. 6A and FIG. 6B are diagrams illustrating exemplary prescribed movement data when performing a driving operation of perpendicular parking to the right side. FIG. 5A and FIG. 6A each illustrate a prescribed movement pattern, which is image data representing an operation start position ST1, ST2, an operation end position EN1, EN2, and a tire trace TR1, TR2 when performing the driving operation according to the chronological data illustrated in FIG. 5B and FIG. 6B, respectively.

First, the user, e.g., a driver, selects one of the prescribed movement patterns stored in the prescribed movement pattern storage means 108 by using pattern selection means (not shown). The superimposition means 102 produces a synthesized image by superimposing the selected prescribed movement pattern (e.g., FIG. 5A) on the surrounding condition image produced by the viewpoint conversion means 106 (e.g., FIG. 4). The display unit 107 displays the synthesized image. At this time, if the operation start position ST1 of FIG. 5A, for example, is aligned with the current position of the vehicle, the operation end position EN1 is the parking position, i.e., the operation end position in a case where the driving operation corresponding to the prescribed movement pattern is started from the current position.

Figure 7:
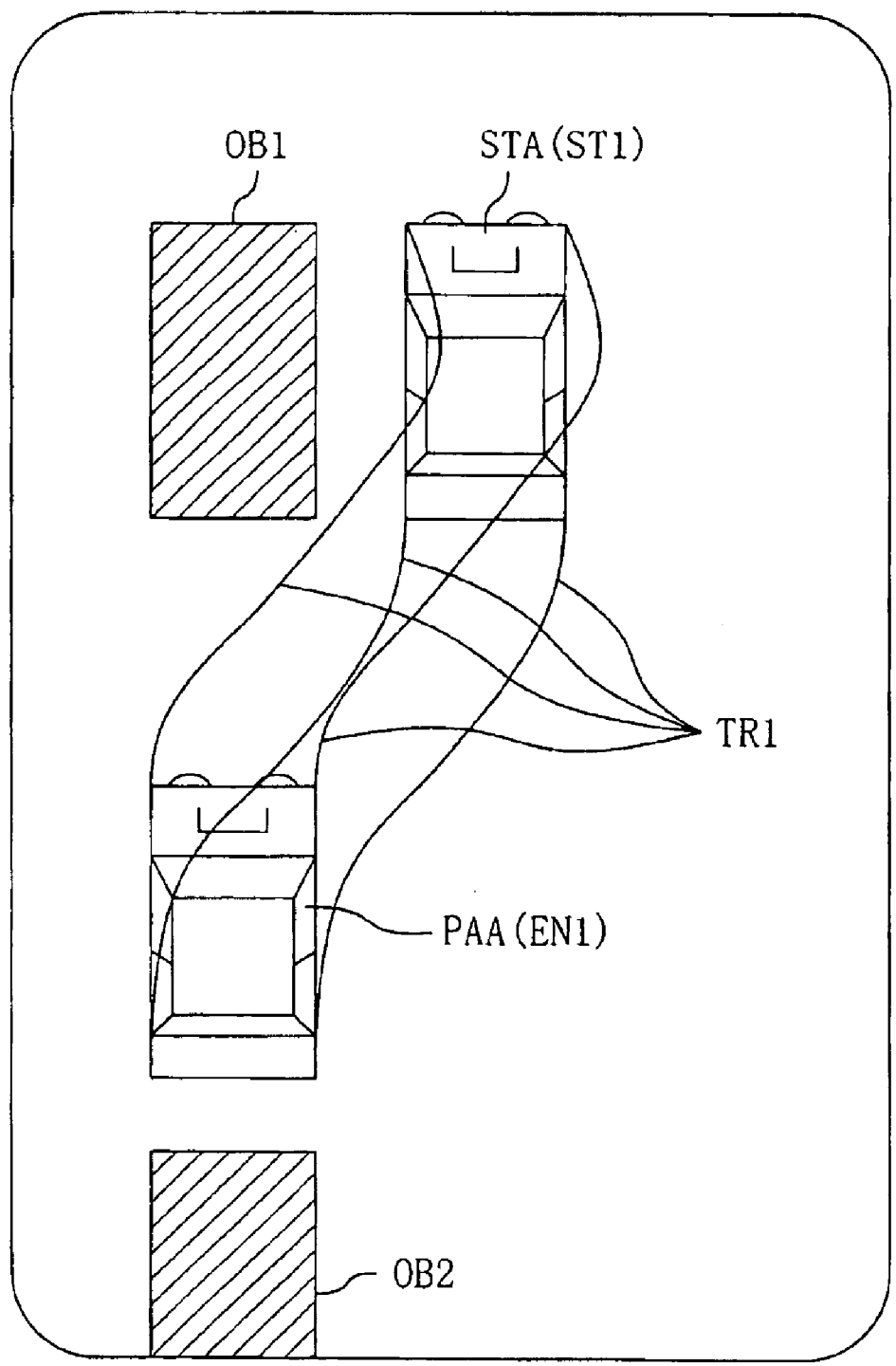
FIG. 7 is a diagram illustrating a synthesized image including the prescribed movement pattern of FIG. 5A and FIG. 5B.
Figure 8:
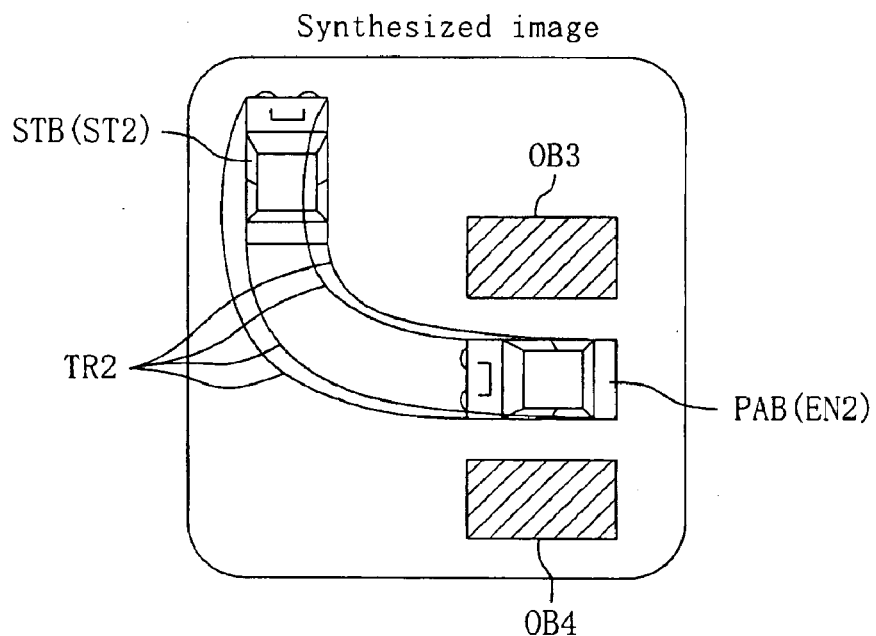
FIG. 8 is a diagram illustrating a synthesized image including the prescribed movement pattern of FIG. 6A and FIG. 6B.

FIG. 7 is a diagram illustrating an exemplary synthesized image obtained by synthesizing the prescribed movement pattern illustrated in FIG. 5A and FIG. 5B, and FIG. 8 is a diagram illustrating an exemplary synthesized image obtained by synthesizing the prescribed movement pattern illustrated in FIG. 6A and FIG. 6B.

Specifically, referring to FIG. 7, the driver moves the vehicle to a start position STA such that a parking position PAA (EN1), the tire trace TR1 and the start position STA (ST1) do not interfere with the obstacles OB1 and OB2. Then, the driver can perform parallel parking to the left side to park the vehicle into the parking position PAA by starting a series of driving operations according to the chronological data illustrated in FIG. 5B from the start position STA. Similarly, referring to FIG. 8, the driver moves the vehicle to a start position STB such that a parking position PAB (EN2), the tire trace TR2 and the start position STB (ST2) do not interfere with obstacles OB3 and OB4. Then, the driver can perform perpendicular parking to the right side to park the vehicle into the parking position PAB by starting a series of driving operations from the start position STB according to the chronological data shown in FIG. 6B.

The detailed process of moving the vehicle to the start position STA will be described with reference to FIG. 9 and FIG. 10A to FIG. 10C for the case of performing parallel parking to the left side.

Figure 9:
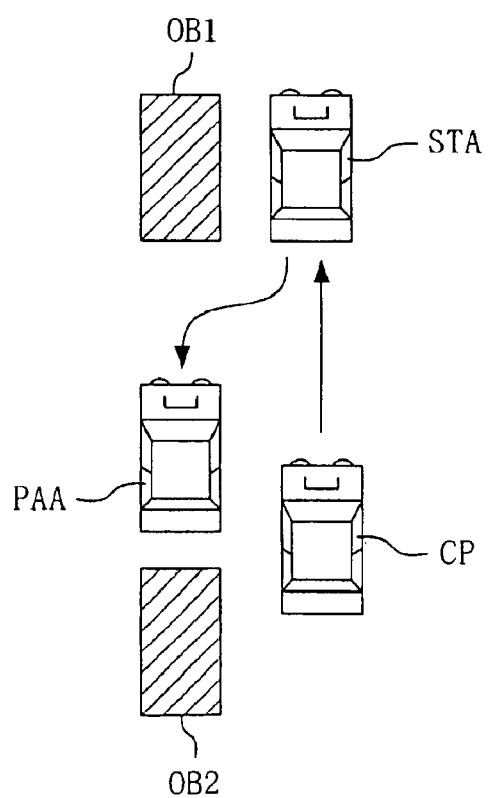
FIG. 9 is a diagram illustrating the movement of a vehicle when performing parallel parking to the left side.

FIG. 9 is a diagram illustrating the movement of the vehicle when performing parallel parking to the left side. As illustrated in FIG. 9, in order to park the vehicle into the target parking position PAA, the driver of the vehicle first needs to move the vehicle which is located at a current position CP to the target start position STA. The target start position STA corresponds to the operation start position ST1 with the operation end position EN1 of the prescribed movement pattern of performing parallel parking to the left side as illustrated in FIG. 5A being aligned with the target parking position PAA.

The positional relationship between the operation end position EN1 and the operation start position ST1 in the prescribed movement pattern illustrated in FIG. 5A corresponds to the case where a driving operation is performed according to the chronological data illustrated in FIG. 5B. In an actual driving operation, fine adjustments can be made by, for example, slightly turning the steering wheel, etc.

If the driving operation assisting system of the present embodiment is not used, the driver needs to do checking from the inside of the vehicle through direct viewing, looking in a mirror, etc., so as to recognize the obstacles OB1 and OB2, and to move the vehicle to the target start position STA while paying attention to the target parking position PAA. Such a task requires a considerable amount of practice. Moreover, when the size and/or the mirror position of the vehicle change, for example, the driver cannot immediately adapt to the changes.

In contrast, with the driving operation assisting system of the present embodiment, images obtained by the cameras mounted on the vehicle are used to produce a surrounding condition image as illustrated in FIG. 4 which looks as if it were taken from above the vehicle, and a prescribed movement pattern as illustrated in FIG. 5A is superimposed thereon, so as to display a synthesized image as illustrated in FIG. 7 to the driver.

Figure 10A:
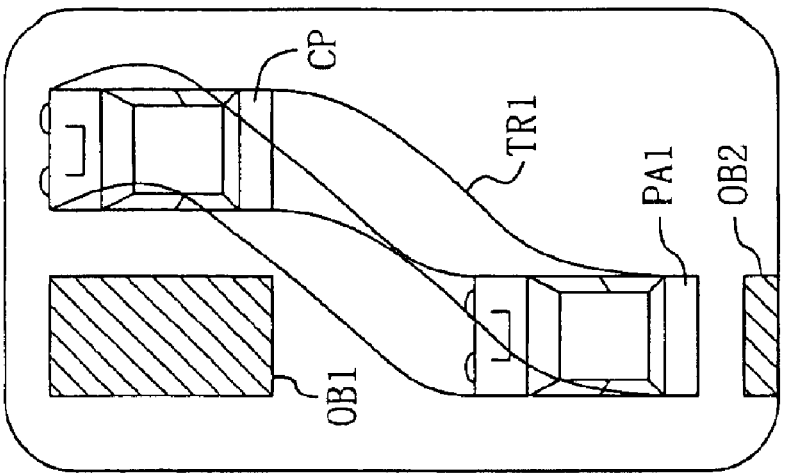
FIG. 10A, FIG. 10B and FIG. 10C are diagrams each illustrating an exemplary image display when moving a vehicle to a start position.
Figure 10B:
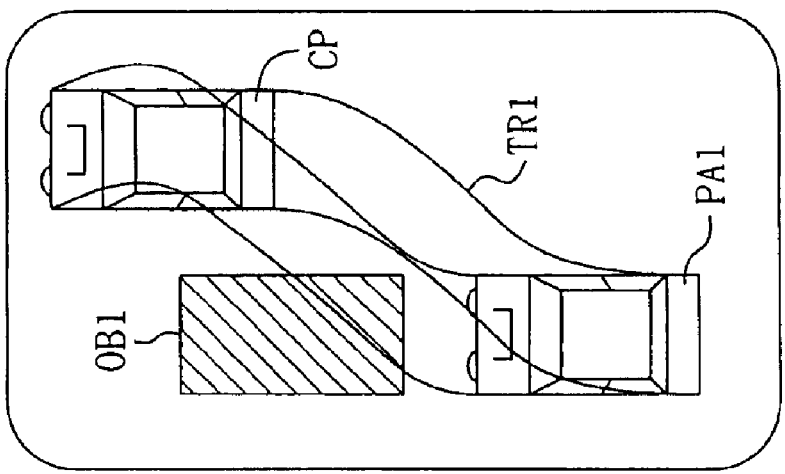
Figure 10C:
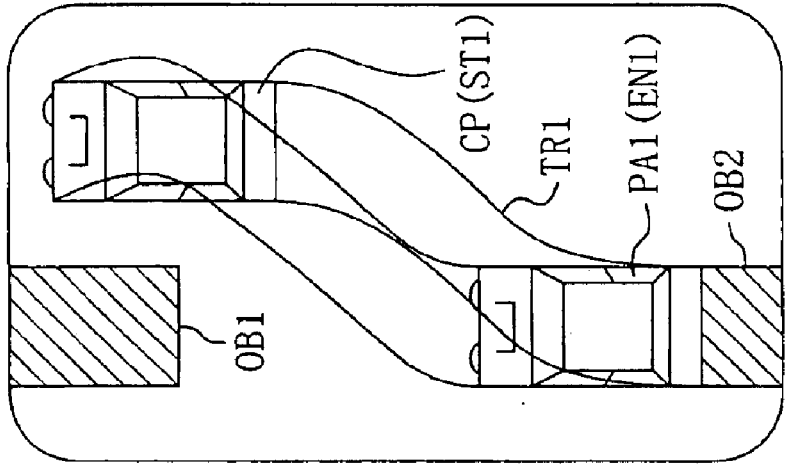

Therefore, when performing a driving operation of moving the vehicle to the target start position STA of FIG. 9, the prescribed movement pattern as illustrated in FIG. 5A is displayed while the current position CP of the vehicle and the operation start position ST1 are aligned with each other, as illustrated in FIG. 10A to FIG. 10C. Thus, along with the tire trace TR1, the operation end position EN1 is displayed as a parking position PA1 corresponding to the current position CP, with the operation start position ST1 being the current position CP. When the vehicle is at the current position CP such that the parking position PA1 coincides with the target parking position PAA, the movement to the target start position STA is complete.

Specifically, in the case of a synthesized image 1 of FIG. 10A, the parking position PA1 overlaps with the obstacle OB2. Therefore, the driver can determine at a glance that the vehicle may possibly contact the obstacle OB2 if the driver starts the parking operation from the current position CP. Thus, the driver can easily recognize that the driver needs to further move the vehicle forward (upward in FIG. 10A to FIG. 10C) before starting the parking operation.

Moreover, in the case of a synthesized image 2 of FIG. 10B, the tire trace TR1 overlaps with the obstacle OB1. Therefore, the driver can determine at a glance that the vehicle may possibly contact the obstacle OB1 if the driver starts the parking operation from the current position CP. Thus, the driver can easily recognize that the driver needs to further move the vehicle backward (downward in FIG. 10A to FIG. 10C) before starting the parking operation.

On the other hand, in the case of a synthesized image 3 of FIG. 10C, it can be seen that the tire trace TR1 does not overlap with the obstacle OB1 or OB2 and that the parking position PA1 is a suitable position for parking. Thus, the driver can recognize that the driver can start the parking operation from the current position CP.

As described above, by virtually synthesizing an image of the vehicle as viewed from above with another image representing the positional relationship among the surrounding obstacles, the parking end position, and the tire trace, to show the synthesized image to the driver, the driver can determine at a glance the positional relationship. As a result, the driver can determine at a glance the suitable position from which to start the parking operation, and can move the vehicle to such a position before starting the parking operation, whereby it is possible to park the vehicle into the intended position in a safer and more reliable manner.

The operation start position, the operation end position and the tire trace, which represent the prescribed movement pattern, are inherent to each vehicle, and significantly differ between a small vehicle and a large vehicle, for example. This can be addressed by storing different prescribed movement patterns for different vehicles in the prescribed movement pattern storage means 108 of FIG. 1. Then, even when driving a different vehicle, the driver can perform the driving operation while viewing the positional relationship between a prescribed movement pattern and the surrounding obstacles, etc., for that vehicle.

Moreover, it is possible that the arrangement and/or the number of the on-vehicle cameras as illustrated in FIG. 2 may change from one vehicle to another. However, this can also be addressed by storing, in the camera parameter table 103, the camera parameters of the cameras for each vehicle, and does not directly influence the image displayed to the driver. Therefore, even when the camera arrangement changes for a different vehicle, the driver can perform a driving operation while viewing the positional relationship between a prescribed movement pattern and the surrounding obstacles, etc., for that vehicle, which is displayed in substantially the same manner as when the driver was driving the previous vehicle.

As described above, according to the present embodiment, in a driving operation such as parallel parking which requires the driver to have a considerable skill, it is possible to determine at a glance the positional relationship between the vehicle and obstacles, the target position, etc. Therefore, it is possible to perform a driving operation in a safer and more reliable manner, thus significantly reducing the operation burden on the driver.

Moreover, even when the vehicle, etc., is changed to another vehicle, the driver can perform a driving operation while viewing the positional relationship between a prescribed movement pattern and the surrounding obstacles, etc., for that vehicle, in a similar manner as when the driver was driving the previous vehicle. Therefore, it is possible to significantly reduce the practice burden which is otherwise imposed on the driver when the driver changes a vehicle to another.

FIG. 11 is a diagram illustrating exemplary variations of prescribed movement patterns stored in the prescribed movement pattern storage means 108 of FIG. 1. FIG. 11 illustrates prescribed movement patterns PT1 and PT2 for parallel parking to the left side and to the right side, respectively, and prescribed movement patterns PT3 and PT4 for perpendicular parking to the left side and to the right side, respectively. As described above, the driver selects one of the prescribed movement patterns PT1 to PT4 by using the pattern selection means (not shown), and the area to be displayed as a synthesized image (shown as a frame in FIG. 11) is also determined according to the selected prescribed movement pattern. Specifically, a rectangular area including the operation start position, the tire trace, and the operation end position is used as a synthesized image area.

Note that while the image of the vehicle body is not typically taken from the on-vehicle cameras, it is preferred to store CG data, picture data, or the like, of the vehicle and display it while being superimposed on the synthesized image as is the trace data.

Note that in the present embodiment, the prescribed movement pattern has been described as image data representing the operation start position, the operation end position and the tire trace, but the present invention is not limited to this. For example, the trace of the entire vehicle as projected onto a plane may be used in place of, or in addition to, the tire trace. In short, the prescribed movement pattern of the present invention may be any type of image data as long as it represents the movement of a vehicle as a predetermined series of driving operations are performed.

Figure 12:
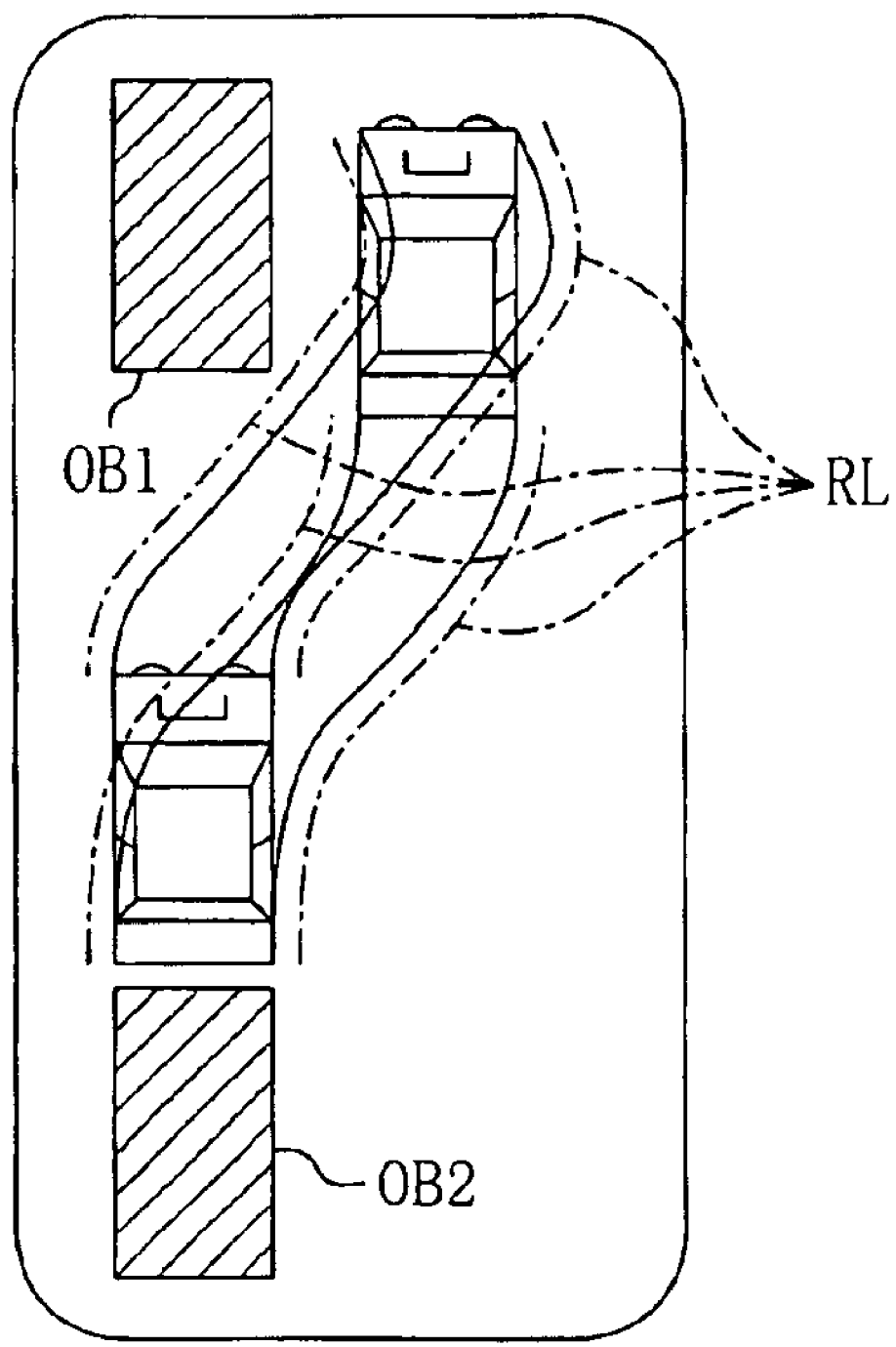
FIG. 12 is a diagram illustrating an exemplary synthesized image in which clearance lines are displayed.

Moreover, if the tire trace and/or the area where the entire vehicle passes are displayed as they are, there is no clearance for preventing the vehicle from contacting an obstacle, etc. In view of this, it is possible to display a clearance line RL which is disposed outwardly away from the outer edge of the tire trace or the area where the entire vehicle passes by a predetermined amount (e.g., 50 cm), as illustrated in FIG. 12.

Moreover, in the present embodiment, the surrounding condition image is produced by synthesizing image data which is taken by the imaging section 101 in a real time manner, but the present invention is not limited to this. For example, in a case where the same driving operation is frequently performed in a place such that the surrounding conditions hardly change, it is possible to store, in the space data buffer 105, data which is produced from the previously-taken image data, so that the stored data can be used.

Hereinafter, another embodiment of the present invention will be described, in which when the user, e.g., a driver, specifies the end position (i.e., the position of the vehicle at the end of a driving operation such as parallel parking), the start position (i.e., the position of the vehicle at the beginning of the driving operation) is displayed automatically. In the present embodiment, the end position input means 201, the start position determination means 202 and the space fixing means 203, which have not been specifically referred to in the description hitherto, are used.

Herein, it is assumed that the end position is input when the vehicle is in the vicinity of the end position. Being "in the vicinity of the end position" means that the vehicle to be parked is near the end position, and the phrase is generally defined as a state where the distance between the vehicle to be parked and the end position is shorter than the distance between the end position and the start position. However, the phrase herein also includes other states where there is no obstacle between the end position and the vehicle to be parked so that the visibility is good.

The case of parallel parking to the left side will now be described with reference to FIG. 13A, FIG. 13B and FIG. 13C. The process of producing a surrounding condition image from image data which has been taken by the imaging section 101 is as described above. Moreover, the process in which the superimposition means 102 displays a prescribed movement pattern stored in the prescribed movement pattern storage means 108 on a synthesized image is as described above.

In order to park between the obstacles OB1 and OB2, the driver first moves the vehicle to be parked closer to a position (current position CP3) in the vicinity of the target parking position so as not to contact the obstacles OB1 and OB2, as illustrated in FIG. 13A, and then the vehicle to be parked and the surrounding image are displayed on the display unit 107. Then, using a pointer PO which is displayed on the screen of the display unit 107, the driver specifies the target parking position, i.e., an end position EN3. At this time, as illustrated in FIG. 13A, a start position ST3 from which the driving operation is started is determined corresponding to the specified end position EN3 and according to a prescribed movement pattern MP3 which is preselected by the driver, and the start position ST3 is displayed on the screen along with the prescribed movement pattern MP3.

The driver can determine on the screen whether the start position ST3 and the prescribed movement pattern MP3 will contact the obstacles OB1 and OB2. If there is contact, the end position EN3 is changed again with the use of the pointer PO so that the start position ST3 and the prescribed movement pattern MP3 will not contact the obstacles OB1 and OB2.

If there is no contact, the driver can move the vehicle to the start position ST3 while viewing the screen (FIG. 13B). At this time, since the prescribed movement pattern MP3 is fixed to a space by the space fixing means 203, the positional relationship between the prescribed movement pattern MP3 and the obstacles OB1 and OB2 does not change.

Such a driving operation assisting method provides an effect that it is possible to efficiently obtain the start position of a driving operation, in addition to the other effects described above. Therefore, it is possible to reduce the amount of time required before the operation can be started. Moreover, since the target position can be specified when the vehicle to be parked has come close to the target position, it is possible to more accurately specify the target position. For example, in the example described above, the target position is determined while the start position of the prescribed movement pattern is aligned with the current position of the vehicle to be parked. Therefore, the target position and the current position of the vehicle to be parked may be relatively far away from each other. Thus, in some cases, it is difficult to accurately determine the positional relationship between the target position and obstacles, etc., due to the influence of a distortion caused by the cameras and/or the viewpoint. Nevertheless, the problem is improved by this method.

Note that once the start position ST3 is determined, the vehicle may be automatically driven from the current position CP3 to the start position ST3, as illustrated in FIG. 13C. Specifically, the positional relationship between the start position ST3 and the current position CP3 is calculated, and chronological data is obtained regarding the steering angle and the number of revolutions of wheel required to guide the vehicle from the current position CP3 to the start position ST3. Since a parking operation is performed at a low speed, it is approximately assumed that no side skid of tire occurs, and the so-called "Ackerman model" (two-wheel model) is used so as to calculate the steering angle and the number of revolutions of wheel based on the amount of parallel movement and the amount of rotation required for guiding the vehicle. Then, according to the chronological data, a steering angle control signal and a drive wheel rotation speed control signal are produced so as to control the steering control system and the wheel driving system, thereby automatically controlling the driving operation of the vehicle.

Moreover, the driving operation according to the prescribed movement pattern MP3 from the start position ST3 to the end position EN3 may also be automated. Specifically, the driving operation can be automatically performed by automatically generating each steering rudder angle corresponding to the tire rotation as illustrated in FIG. 5B, for example. By such an automatic driving operation, the vehicle is guided to the start position ST3 or to the end position EN3 without the driver's operation of the vehicle, whereby it is possible to realize an easier and safer operation of the vehicle.

Note that the automatic driving operation as used herein may be a full-automatic driving operation of automatically operating the brake and the accelerator in addition to automatically generating each steering rudder angle corresponding to the tire rotation (steering operation), or a semi-automatic driving operation of automatically performing the steering operation, with the driver operating only the brake and the accelerator to instruct the vehicle to "stop" and "go" while checking the surrounding conditions.

Second Embodiment

Figure 14:
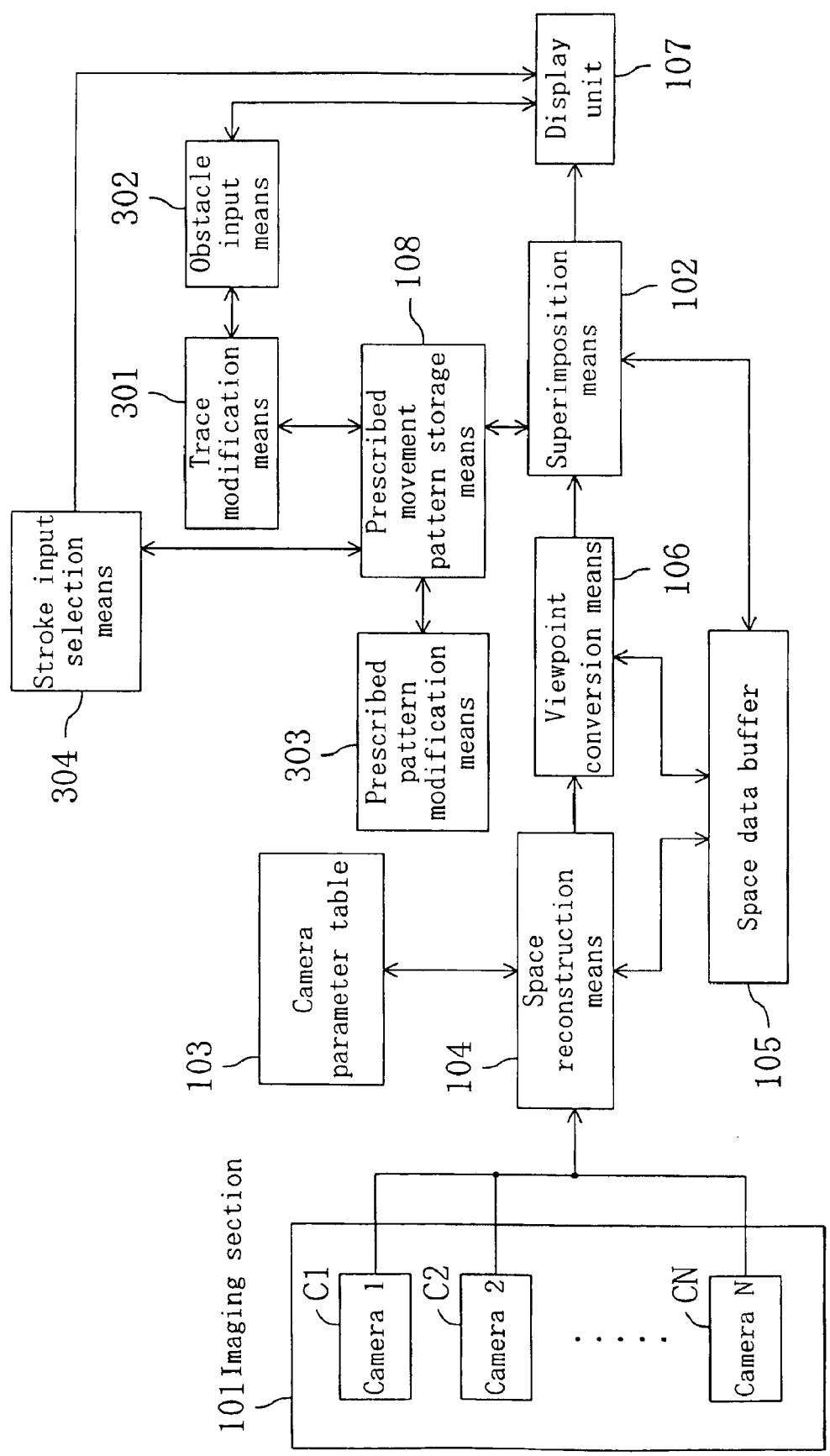
FIG. 14 is a block diagram illustrating a configuration of a driving operation assisting system according to the second embodiment of the present invention.

FIG. 14 is a block diagram illustrating a configuration of a driving operation assisting system according to the second embodiment of the present invention. The driving operation assisting system of the present embodiment also primarily aims to provide an assistance in a driving operation such as perpendicular parking, parallel parking, and the like. Therefore, in the present embodiment, the elements/functions not specifically described below are assumed to be as those of the first embodiment, and the elements having the same reference numerals as those in FIG. 1 are assumed to have similar functions as those of FIG. 1 unless otherwise indicated. Moreover, it is assumed that each variation described in the first embodiment can be similarly applied to the present embodiment unless otherwise indicated.

In the present embodiment, surrounding condition imaging means is provided including the imaging section 101, the camera parameter table 103, the space reconstruction means 104, the space data buffer 105 and the viewpoint conversion means 106. Moreover, synthesized image production means is provided including the superimposition means 102.

Figures 15A, 15B:
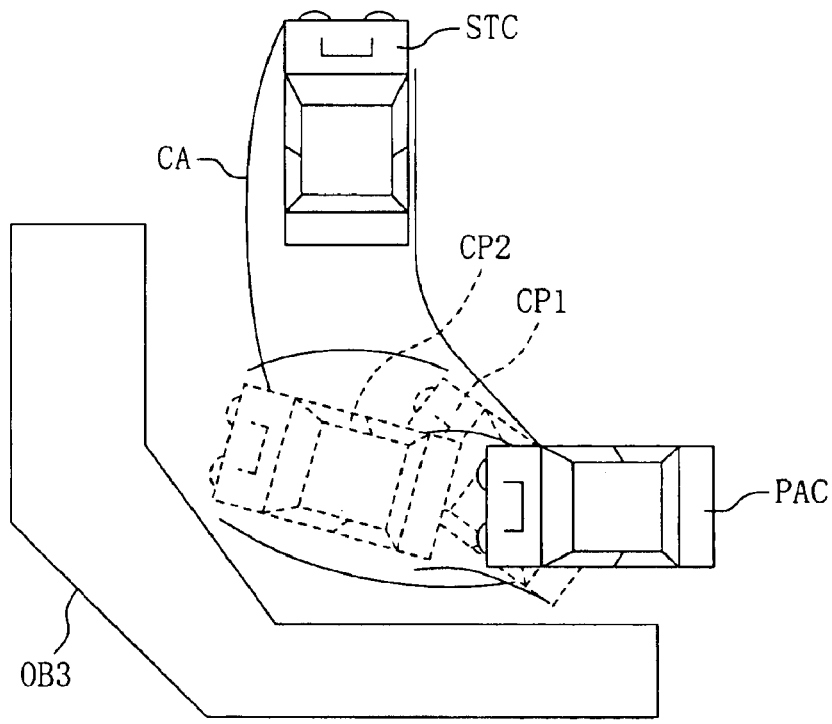
FIG. 15A and FIG. 15B are diagrams illustrating exemplary prescribed movement data for a movement pattern involving jockeying.

The driving operation assisting system of FIG. 14 differs from the driving operation assisting system of the first embodiment in that the former includes trace modification means 301, obstacle input means 302, prescribed pattern modification means 303, and stroke input selection means 304 as pattern selection means, and in that the prescribed movement pattern storage means 108 contains a prescribed movement pattern involving jockeying, i.e., a prescribed movement pattern in which the direction of the movement of the vehicle is switched from the backward direction to the forward direction, or vice versa, in the middle of the driving operation, as illustrated in FIG. 15A.

In this case, steering rudder angle data corresponding to the number of revolutions of tire as illustrated in FIG. 15B is stored in the prescribed movement pattern storage means 108 as the chronological data of the prescribed movement pattern. As illustrated in FIG. 15B, the first four rows of the table where the number of revolutions of tire is 0 to 0.8 correspond to a period during which the vehicle is moved backward, after which the direction of the movement of the vehicle is switched from the backward direction to the forward direction. At this time, the vehicle is at a backward-forward switching position CP1 illustrated in FIG. 15A. The next two rows of the table where the number of revolutions of tire is 0.8 to 0.6 correspond to a period during which the vehicle is moved forward, and the direction of the movement of the vehicle is again switched from the forward direction to the backward direction when the vehicle reaches a forward-backward switching position CP2 illustrated in FIG. 15A, after which the vehicle is moved backward during a period corresponding to the last five rows of the table where the number of revolutions of tire is 0.6 to 1.4.

By using such a prescribed movement pattern involving jockeying, it is possible to control the position/direction of the vehicle even when there is only a small clearance with respect to an obstacle as illustrated in FIG. 15A.

In the present embodiment, the process of producing a surrounding condition image from image data taken by the imaging section 101 is as that described above in the first embodiment. Moreover, the process of displaying a prescribed movement pattern stored in the prescribed movement pattern storage means 108 on a synthesized image so that the start position of the prescribed movement pattern is aligned with the current position of the vehicle by using the superimposition means 102 is as that described above in the first embodiment.

The process after the prescribed movement pattern is displayed on the synthesized image, in which the driver modifies the prescribed movement pattern and the chronological data by using the trace modification means 301 and the obstacle input means 302 so that the modified prescribed movement pattern is displayed on the synthesized image will now be described with respect to an exemplary case of perpendicular parking to the right side.

Figure 16:
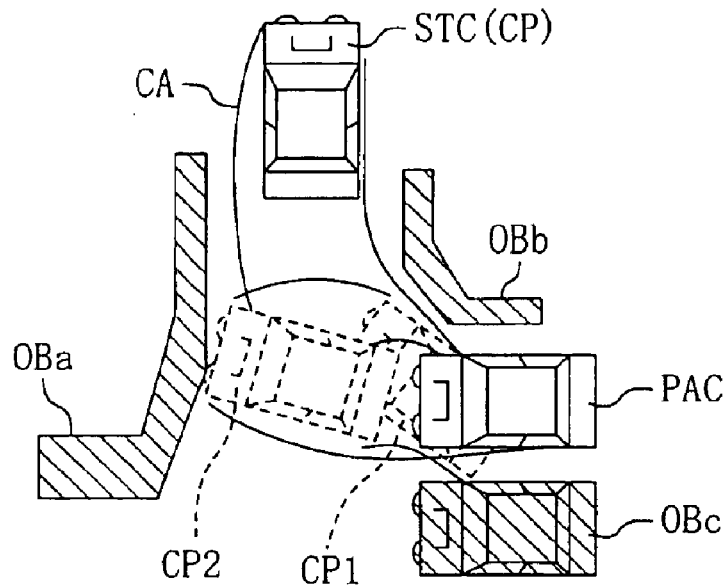
FIG. 16 is a diagram illustrating an exemplary synthesized image including the prescribed movement pattern illustrated in FIG. 15A and FIG. 15B.

It is assumed that the driver has moved the vehicle to the current position CP such that the operation end position of the prescribed movement pattern coincides with a target parking position PAC, as illustrated in FIG. 16, in order to perform a perpendicular parking operation with the target parking position PAC being the operation end position so as not to contact an obstacle OBa, OBb or OBc. Consider a case where it is determined that a circumscribed area CA of the prescribed movement pattern may possibly contact the obstacle OBa, OBb or OB.

Although the prescribed movement pattern storage means 108 stores many prescribed movement patterns as described above, it is considerably troublesome for the driver to select by a switch, or the like, an appropriate one of the prescribed movement patterns.

Figure 17:
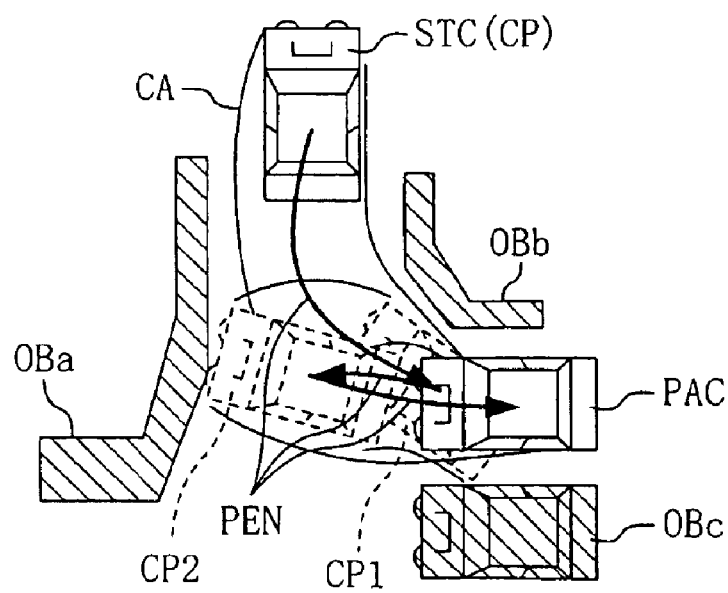
FIG. 17 is a diagram illustrating a selection input operation for inputting a prescribed movement pattern through a pen input operation.

In view of this, in the present embodiment, the user, e.g., a driver, selects an appropriate prescribed pattern by using the stroke input selection means 304. The stroke input selection means 304 is designed to allow the user to input by a pen (pointer) a prescribed trace of the vehicle on the display screen. As illustrated in FIG. 17, the outline of a movement pattern involves jockeying for parking the vehicle to be parked from the position CP of the vehicle to be parked into the target position PAC while avoiding the obstacles OBa, OBb and OBc can be input by the user using a pen through the stroke input selection means 304 while the user views the screen. The stroke input selection means 304 selects a prescribed movement pattern which is closest to the pen input from among a plurality of prescribed movement patterns stored in the prescribed movement pattern storage means 108.

Note that the stroke input selection means 304 receives the driver's input while updating a stroke trace PEN corresponding to the pen input and the circumscribed area CA on the screen, as illustrated in FIG. 17. In this process, the stroke input selection means 304 receives and processes the driver's pen input while reflecting limitations such as the actual smallest turning radius of the vehicle. Therefore, even if the driver inputs by a pen a turn whose radius is smaller than the actual smallest turning radius of the vehicle, for example, the stroke input selection means 304 receives the input as a turn of the actual smallest turning radius of the vehicle. Moreover, the stroke trace PEN displayed on the screen will also reflect the limitations such as the smallest turning radius of the vehicle. Therefore, the driver can input by a pen a movement pattern while viewing the stroke trace PEN and checking if jockeying is actually necessary to avoid an obstacle. Thus, it is possible to easily select and input a more appropriate prescribed movement pattern.

Note that if the selected prescribed movement pattern still interferes with an obstacle, or the like, the driver can modify the prescribed movement pattern as follows.

Figure 18:
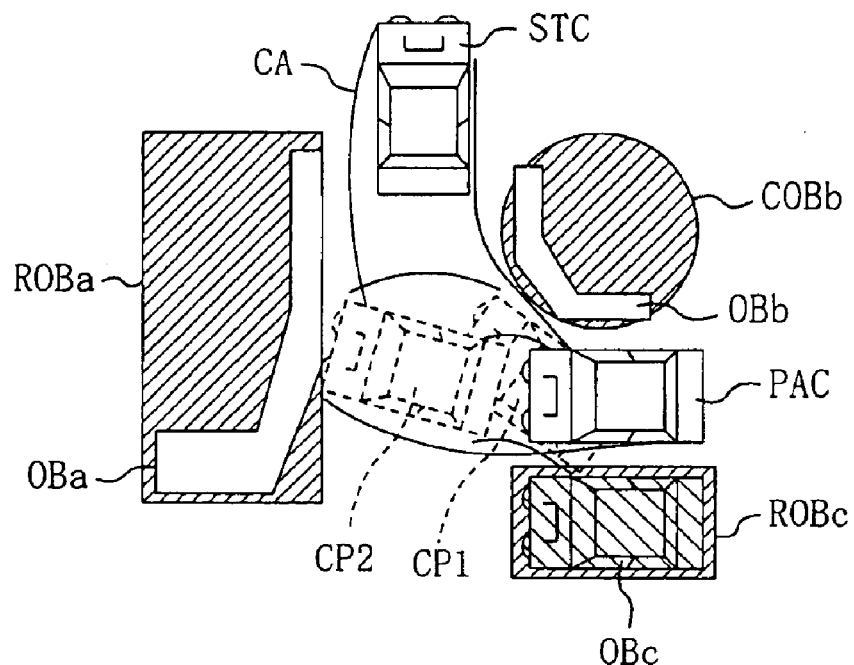
FIG. 18 is a diagram illustrating an input operation for inputting an obstacle area.

First, the driver sets the current position CP in the synthesized image (FIG. 16) displayed on the display unit 107 to be a parking operation start position STC. Then, as illustrated in FIG. 18, the driver uses the obstacle input means 302 to define the areas in the image where the obstacles OBa, OBb and OBc exist as obstacle areas ROBa, COBb and ROBc by using a rectangle or a circle through a numeric input operation or with a pointer, etc. When the target parking position PAC needs to be modified, the target parking position PAC is moved similarly through a numeric input operation or with a pointer, etc.

Figure 19:
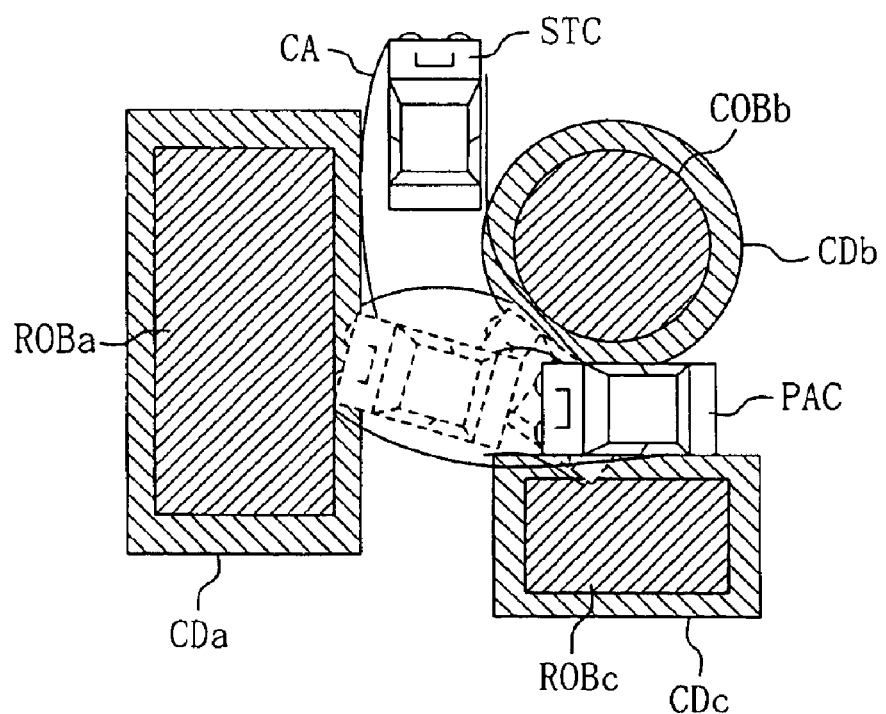
FIG. 19 is a diagram illustrating a synthesized image in which a contact danger area is displayed in an obstacle area.
Figure 20:
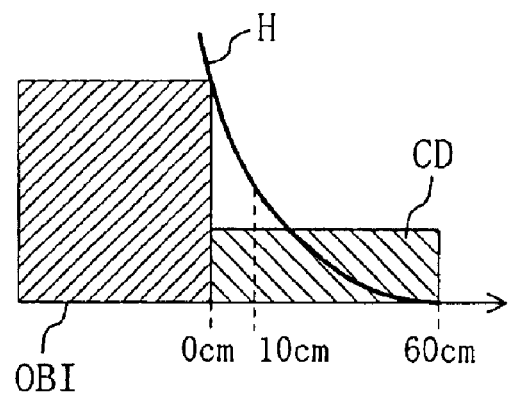
FIG. 20 is a diagram illustrating a contact danger evaluation function.

Once the obstacle areas ROBa, COBb and ROBc are defined, the trace modification means 301 defines each of the obstacle areas ROBa, COBb and ROBc plus a 60-cm peripheral area as contact danger areas CDa, CDb and CDc, respectively, as illustrated in FIG. 19. Then, a contact danger evaluation function H as illustrated in FIG. 20 is given for each of the obstacle areas ROBa, COBb and ROBc. The function H sharply increases as it comes closer to an obstacle in the region where the distance from an obstacle area OBI is 10 cm or less, and gently decreases as it goes away from an obstacle in the region where the distance from the obstacle area OBI is 10 cm or more. The value is zero when the distance is 60 cm or more. Thus, the function H is composed of three quadratic functions.

Figure 21:
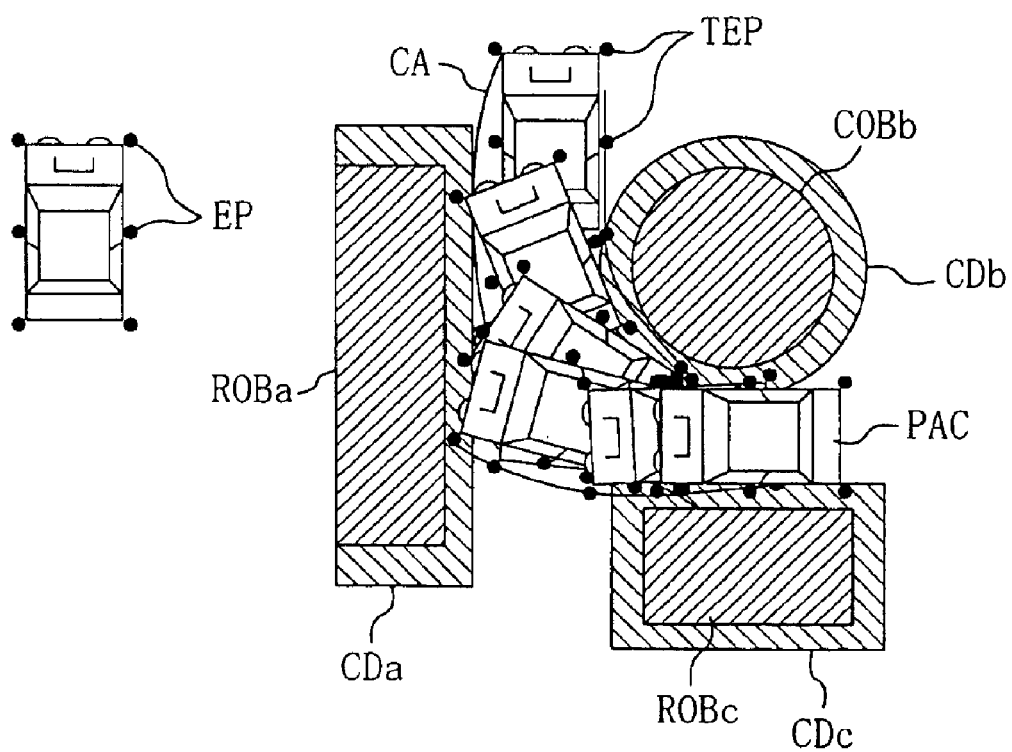
FIG. 21 is a diagram illustrating a calculation of trace evaluation points.
Figure 22:
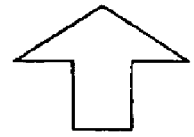
FIG. 22 is a diagram illustrating an exemplary modification of a prescribed movement pattern.

Moreover, as illustrated in FIG. 21, six evaluation points EP (xi, yi) (i=1 to 6) are set around the vehicle. The trace of each of the evaluation points EP (xi, yi) is calculated as a trace evaluation point TEP (xi, yi)n (n=1 to N) with respect to the chronological data (tire rotation tm, tire angle km) (m=1 to N) for each of the N items (rows) of the table illustrated in FIG. 15B.

$$HS=\Sigma n\Sigma i H(Xi, Yi)n=\Sigma n\Sigma i H(fx(tm, km), fy(tm, km))n \quad \text{(Expression 1)}$$

As shown in the expression above, a trace contact danger evaluation function HS is obtained from the sum of the values of the collision danger evaluation function H at the trace evaluation points TEP.

As can be seen from the expression above, the trace contact danger evaluation function HS is a function of the N items (tire rotation tm, tire angle km) shown in FIG. 15B. Therefore, it is possible to obtain chronological data which minimizes the trace contact danger evaluation function HS by successively modifying the N items (tire rotation tm, tire angle km) by using partial differentiation. In this way, it is possible to modify a prescribed movement pattern from the initial chronological data illustrated in FIG. 15B to the chronological data which minimizes the trace contact danger evaluation function HS.

Note that when it is determined, from the collision danger evaluation function H at each trace evaluation point TEP (xi, yi), that there is any point at a distance of 10 cm or less from the obstacle area OBI in the chronological data which minimizes the trace contact danger evaluation function HS, a warning "Caution" is given to the driver. When it is determined that there is any point at a distance of 0 cm or less from the obstacle area OBI, a warning "Parking impossible" is given to the driver.

Figure 23:
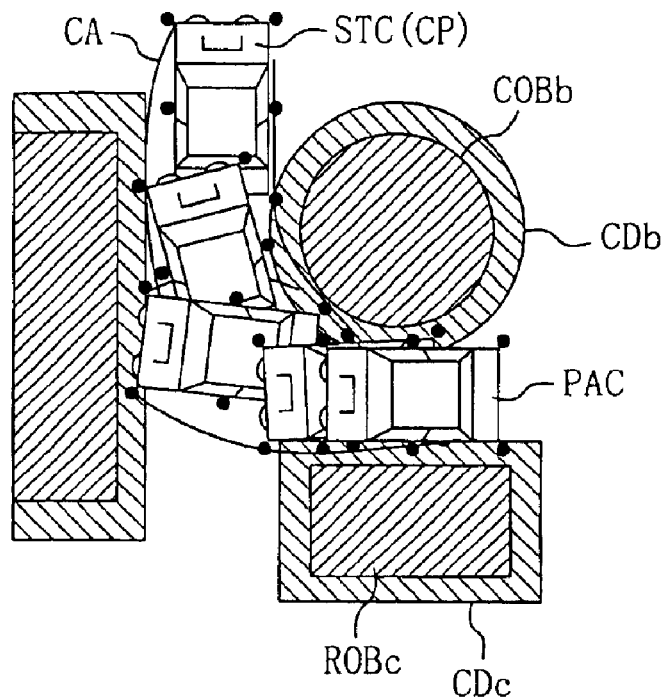
FIG. 23 is a diagram illustrating a synthesized image including a modified prescribed movement pattern.

The modified prescribed movement pattern is a movement pattern which minimizes the trace contact danger evaluation function HS. Therefore, a trace with a greater clearance from each obstacle is produced, as illustrated in FIG. 23, thereby enabling safer parking.

Figure 24:
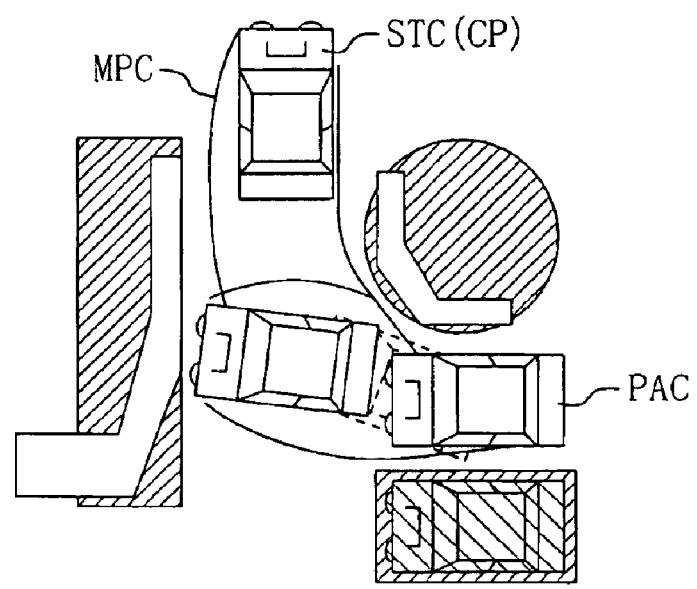
FIG. 24 is a diagram illustrating a synthesized image including a modified prescribed movement pattern.

The superimposition means 102 produces a synthesized image in which the parking operation start position STC of a modified prescribed movement pattern MPC is aligned with the current position CP as illustrated in FIG. 24, and the display unit 107 displays the synthesized image.

Therefore, the driver can park the vehicle into the target parking position PAC with a greater clearance from each obstacle by starting a driving operation (parking operation) according to the new modified prescribed movement pattern MPC.

Note that the produced new prescribed movement pattern and chronological data may be stored in the prescribed movement pattern storage means 108 in place of, or in addition to, the original prescribed movement pattern. Alternatively, the pattern may not be stored in the prescribed movement pattern storage means 108 assuming that it is used only once. Alternatively, each time a new pattern is produced, the driver may choose to store the pattern to replace the original pattern, to additionally store the pattern, or to not store the pattern.

Moreover, in the present embodiment, it is assumed that the prescribed movement pattern to be stored in the prescribed movement pattern storage means 108 in place of, or in addition to, the original pattern is automatically obtained based on the position of the vehicle at the start or end of a parking operation which is input by the driver. Alternatively, for example, the driver may perform a manual parking operation to sample the chronological data, such as the steering rudder angle and the number of revolutions of wheel, from the manual parking operation performed by the driver, so as to produce a prescribed movement pattern from the sampled data.

Moreover, in the present embodiment, it is assumed that the driver inputs the position of an obstacle on the image by using the obstacle input means 302. Alternatively, this may be automated by using three-dimensional obstacle detection means which uses an infrared or ultrasonic sensor, a stereo image, or the like.

As described above, according to the present embodiment, the driver is only required to input the target parking position and/or the obstacle area so as to automatically select the most suitable prescribed movement pattern, thereby realizing the most appropriate parking operation with a safe and easy driving operation. Thus, it is possible to realize a driving operation assisting system with more extendability as compared to the first embodiment.

Third Embodiment

Figure 25:
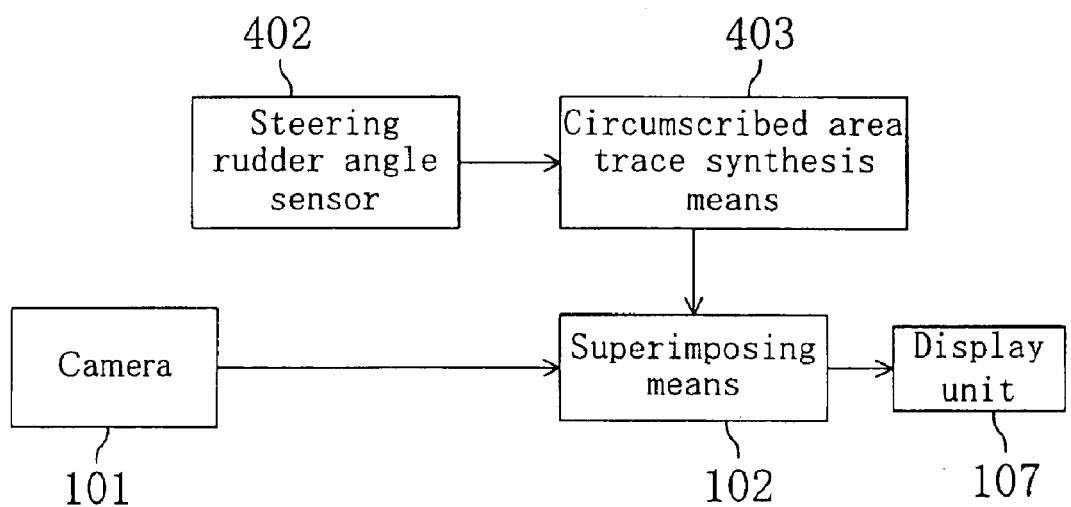
FIG. 25 is a block diagram illustrating a configuration of a driving operation assisting system according to the third embodiment of the present invention.

FIG. 25 is a block diagram illustrating a configuration of a driving operation assisting system according to the third embodiment of the present invention. In the present embodiment, the elements/functions not specifically described below are assumed to be as those of the first embodiment, and the elements having the same reference numerals as those in FIG. 1 are assumed to have similar functions as those of FIG. 1 unless otherwise indicated. Moreover, it is assumed that each variation described in the first embodiment can be similarly applied to the present embodiment unless otherwise indicated. In the present embodiment, an image processing section is provided including the superimposition means 102 and circumscribed area trace synthesis means 403.

Figure 26:
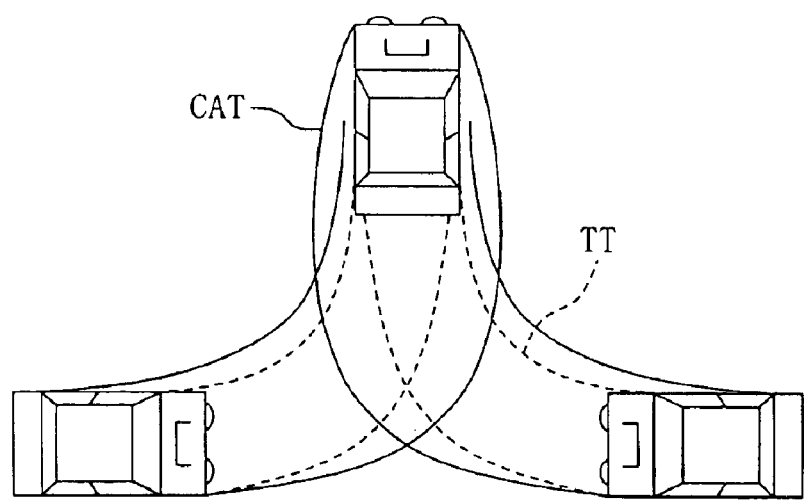
FIG. 26 is a diagram illustrating a circumscribed area trace.
Figure 27:
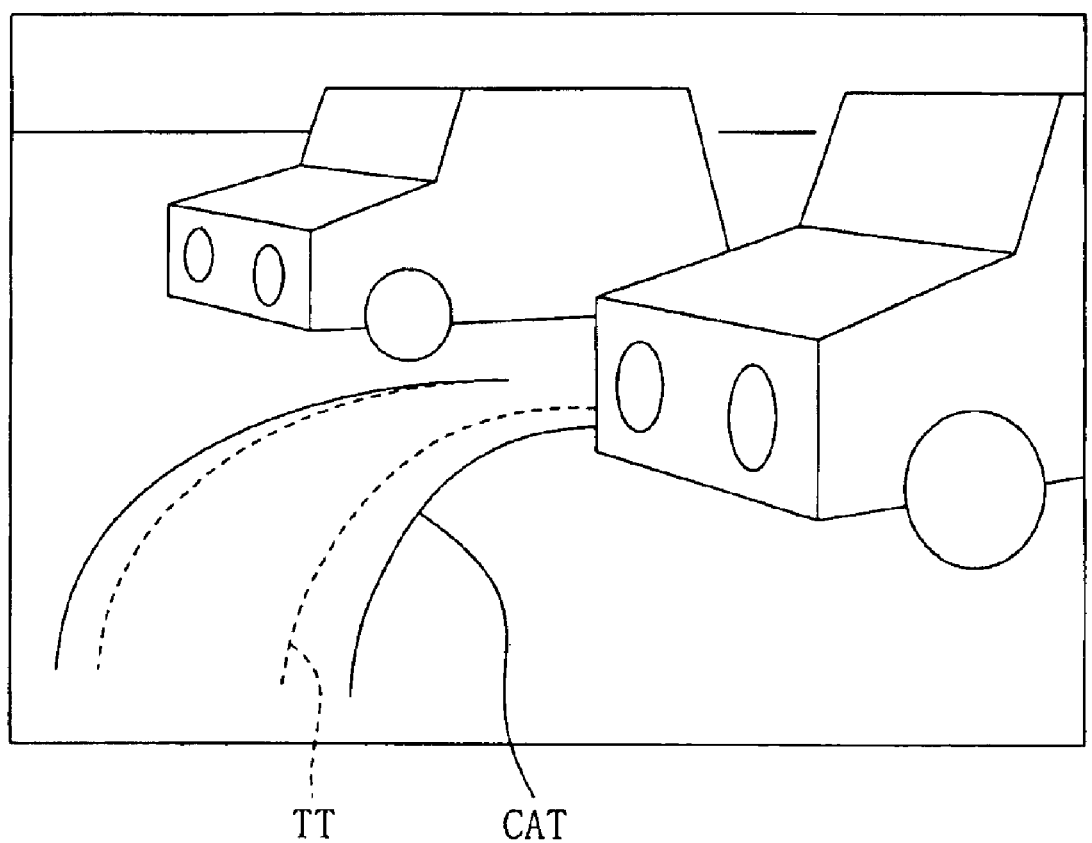
FIG. 27 is a diagram illustrating an exemplary surrounding condition image around a vehicle which is displayed by the system of FIG. 25.

In the driving operation assisting system of the present embodiment, not only a tire trace TT (shown in broken lines) but also a circumscribed area trace CAT (shown in solid lines) of space where the entire vehicle passes is synthesized by the circumscribed area trace synthesis means 403, as illustrated in FIG. 26, for a vehicle which is moved backward with the steering wheel being turned to the left or to the right according to the input from a steering rudder angle sensor 402. Then, as illustrated in FIG. 27, the image obtained by projecting the two traces TT and CAT onto the ground is superimposed by the superimposition means 102 on the image from a camera 101 attached to the rear side of the vehicle, and the obtained image is displayed on the display unit 107.

Thus, according to the present embodiment, not only the tire trace TT but also the circumscribed area trace CAT of space where the entire vehicle passes is displayed according to the steering angle, thereby providing an effect that the driver can precisely determine whether a part of the vehicle which extends beyond the tire, e.g., the right-front portion when parking backward while turning to the left side, will contact an obstacle.

Figure 28:
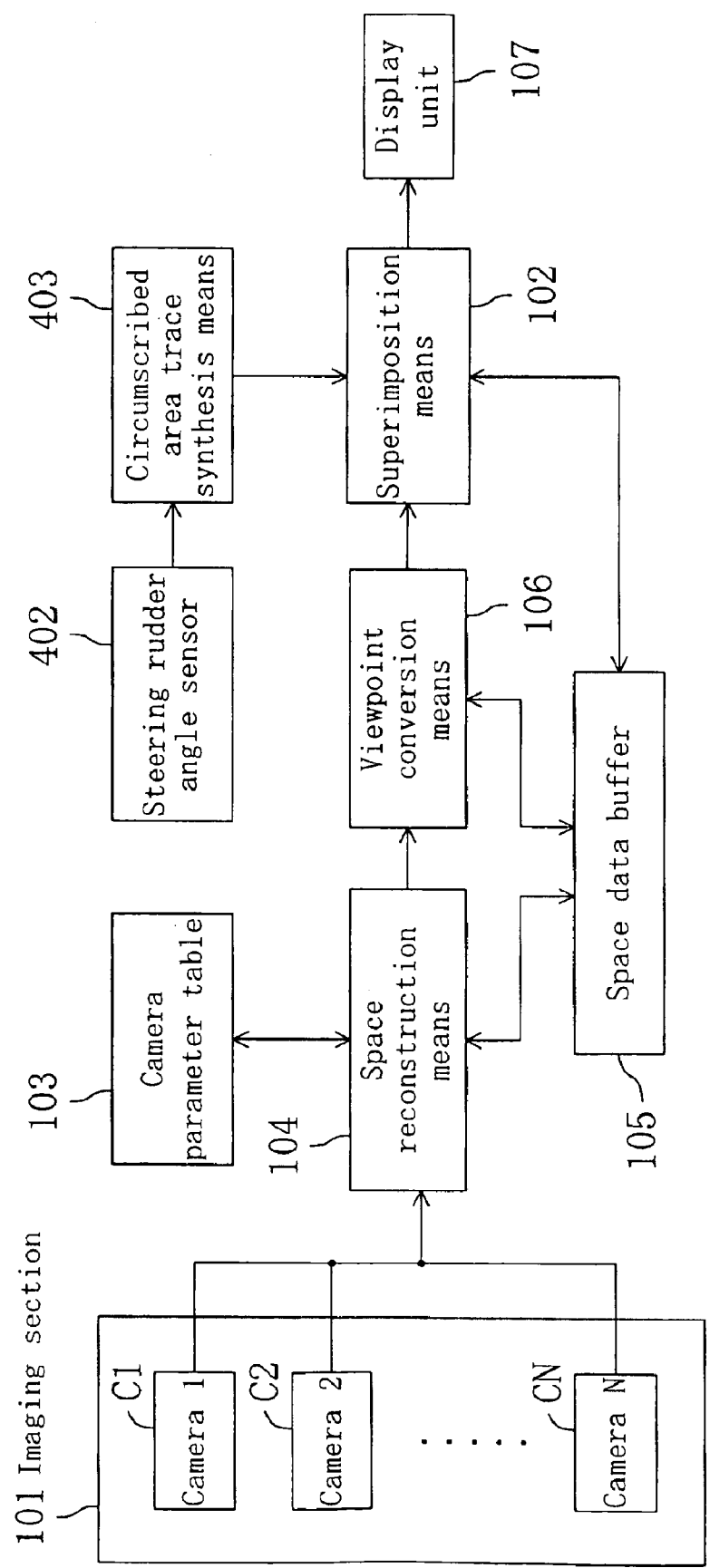
FIG. 28 is a block diagram illustrating another configuration of the driving operation assisting system according to the third embodiment of the present invention.

FIG. 28 is a block diagram illustrating another configuration of the driving operation assisting system according to the present embodiment. In FIG. 28, each element that is also shown in FIG. 1 is denoted by the same reference numeral, and thus will not be further described below. In the present embodiment, an image processing section is provided including the superimposition means 102, the camera parameter table 103, the space reconstruction means 104, the space data buffer 105, the viewpoint conversion means 106 and the circumscribed area trace synthesis means 403.

The driving operation assisting system of FIG. 28 differs from the driving operation assisting system according to the first embodiment in that the former synthesizes not only the tire trace but also the circumscribed area trace of space where the entire vehicle passes by the circumscribed area trace synthesis means 403 for a driving operation of moving the vehicle backward while turning the steering wheel to the left or to the right, according to the input from the steering rudder angle sensor 402, as in the system of FIG. 25. Specifically, as illustrated in FIG. 29, the circumscribed area trace CAT of space where the entire vehicle passes as well as the tire trace TT are displayed in the image as viewed from above the vehicle which is synthesized based on images taken by a plurality of cameras C1 to CN.

Figure 29:
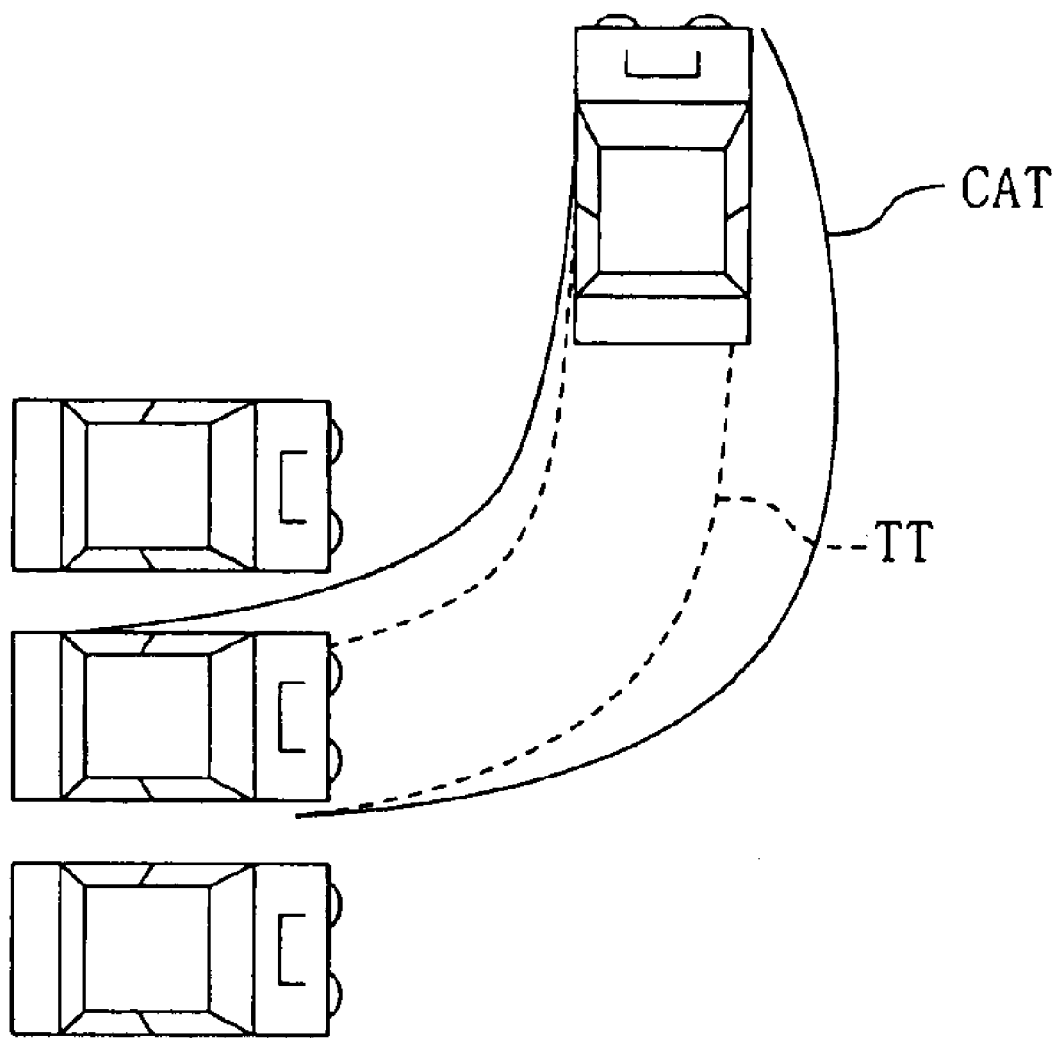
FIG. 29 is a diagram illustrating an exemplary synthesized image which is displayed by the system of FIG. 28.

In this case, the circumscribed area trace CAT of FIG. 29 has the same shape as the circumscribed area trace CAT illustrated in FIG. 26. Generally, a part of the circumscribed area trace CAT of the vehicle to be parked which extends beyond the tire trace TT is a part above the ground, such as a bumper. Thus, the circumscribed area trace CAT of FIG. 29 which shows the trace as viewed from above is easier for the user to recognize than the circumscribed area trace CAT of FIG. 27 which is projected onto the ground. Therefore, as compared to the system illustrated in FIG. 25, the system illustrated in FIG. 28 provides an effect that the user can more precisely determine the positional relationship between the vehicle to be parked and an obstacle.

In each of the embodiments described above, it is assumed that the surrounding condition image is primarily produced as an image from the viewpoint of a virtual camera by synthesizing images from a plurality of on-vehicle cameras, but the present invention is not limited to this. For example, an image from a single camera installed on the ceiling of roofed parking facilities may be used as the surrounding condition image.

Note that a part or whole of the function of the driving operation assisting system of each of the embodiments described above may be implemented by a program to be executed by a computer.

As described above, according to the present invention, only by specifying the end position of a predetermined series of driving operations, the start position of the driving operation can be automatically obtained. Therefore, the amount of time required before starting the driving operation is reduced. Moreover, since a prescribed trace of the vehicle can be input through a pointer input operation on the display screen, the selection of the prescribed movement pattern is significantly facilitated. Furthermore, since the circumscribed area trace of space where the entire vehicle passes is displayed as an image, the user can more precisely determine whether a part of the vehicle which extends beyond the tire will contact an obstacle.

What is claimed is:

1. A method for providing an assistance in a vehicle driving operation by displaying an image representing surrounding conditions around the vehicle on a display unit, the method comprising:
a first step of allowing a user to specify, on the image on the display unit, an end position which is a position of the vehicle at an end of a predetermined driving operation; and
a second step of obtaining, for the end position, a start position which is a position of the vehicle at a start of the predetermined driving operation according to a prescribed movement pattern representing a movement of the vehicle in the predetermined driving operation.

2. The driving operation assisting method of claim 1, further comprising a step of displaying the start position, the end position and the prescribed movement pattern while being superimposed on the image on the display unit.

3. The driving operation assisting method of claim 1, wherein in the first step, the end position specified by the user is taken as an input when the vehicle is in a vicinity of the end position.

4. The driving operation assisting method of claim 1, further comprising a step of performing, in a full-automatic or semi-automatic manner, at least one of an operation of driving the vehicle from a current position of the vehicle to the start position and an operation of driving the vehicle from the start position to the end position according to the prescribed movement pattern.

5. A system for providing an assistance in a vehicle driving operation, the system comprising:
surrounding condition imaging means for producing an image representing surrounding conditions around the vehicle;
prescribed movement pattern storage means for storing a prescribed movement pattern representing a movement of the vehicle in a predetermined driving operation;
synthesized image production means for producing a synthesized image by superimposing the prescribed movement pattern on the surrounding condition image;
a display unit for displaying the synthesized image; and
pattern selection means for selecting the prescribed movement pattern based on a pointer input operation on a screen of the display unit.

6. A system for providing an assistance in a vehicle driving operation, the system comprising an image processing section for producing an image representing surrounding conditions around the vehicle, wherein the image processing section produces a synthesized image by superimposing, on the surrounding condition image, a circumscribed area trace of space where the vehicle passes as the vehicle is moved by a predetermined driving operation.

7. The driving operation assisting system of claim 6, wherein the image processing section produces the surrounding condition image by synthesizing images output from a plurality of cameras provided on the vehicle.

8. A method of assisting a user in operating a vehicle, comprising:
automatically sensing and displaying conditions surrounding the vehicle;
receiving user input specifying an end position and orientation of the vehicle respective of a display of the conditions surrounding a current vehicle position; and
assisting the user based on the current vehicle position, the conditions surrounding the vehicle, and the end position and orientation of the vehicle.

9. The method of claim 8, wherein assisting the user includes superimposing on the display a trace of space where the vehicle passes as the vehicle is moved according to a predetermined driving operation.

10. The method of claim 8, wherein assisting the user includes automatically operating the vehicle to achieve the end position and orientation.

* * * * *